United States Patent
Leighton et al.

(10) Patent No.: US 11,566,392 B2
(45) Date of Patent: Jan. 31, 2023

(54) SCALED HYDROPOWER

(71) Applicant: LITTORAL POWER SYSTEMS, INC., New Bedford, MA (US)

(72) Inventors: Katherine T. Leighton, Media, PA (US); David J. Duquette, Jr., Fairhaven, MA (US); Chad W. Cox, Brookline, MA (US); Mark Graeser, Littleton, CO (US)

(73) Assignee: Littoral Power Systems, Inc., New Bedford, MA (US)

( * ) Notice: Subject to any disclaimer, the term of this patent is extended or adjusted under 35 U.S.C. 154(b) by 0 days.

(21) Appl. No.: 16/883,970

(22) Filed: May 26, 2020

(65) Prior Publication Data

US 2020/0370262 A1  Nov. 26, 2020

Related U.S. Application Data

(60) Provisional application No. 62/852,066, filed on May 23, 2019.

(51) Int. Cl.
*E02B 8/08* (2006.01)
(52) U.S. Cl.
CPC .................................. *E02B 8/085* (2013.01)
(58) Field of Classification Search
CPC ..... Y02E 10/20; Y02E 10/30; F05B 2240/40; F05B 2240/97; F05B 2230/60; F05B 2240/142; F03B 13/08; E02B 9/02; E02B 9/00; E02B 8/06; E02B 8/085; E02B 17/02; E04H 2001/1283; E02D 29/0266
See application file for complete search history.

(56) References Cited

U.S. PATENT DOCUMENTS

| | | | | |
|---|---|---|---|---|
| 4,134,707 A | * | 1/1979 | Ewers | F03D 13/22 415/4.2 |
| 4,992,669 A | * | 2/1991 | Parmley | E04H 5/02 290/1 R |
| 8,123,482 B2 | * | 2/2012 | Achard | F03B 17/063 416/120 |
| 2008/0134589 A1 | * | 6/2008 | Abrams | E04B 1/34384 52/79.1 |
| 2009/0134623 A1 | * | 5/2009 | Krouse | F03B 17/066 290/43 |
| 2011/0089695 A1 | * | 4/2011 | Krouse | F01D 15/10 290/52 |
| 2013/0180182 A1 | * | 7/2013 | Yoo | E04H 1/1272 52/6 |
| 2013/0266378 A1 | * | 10/2013 | French, Sr. | E02B 7/20 405/78 |
| 2015/0048619 A1 | * | 2/2015 | Lin | F03B 13/10 290/54 |

(Continued)

FOREIGN PATENT DOCUMENTS

WO   WO-2017066655 A1 * 4/2017 ............ E02B 9/025

*Primary Examiner* — Carib A Oquendo
(74) *Attorney, Agent, or Firm* — Adler Pollock & Sheehan P.C.

(57) ABSTRACT

A fish passage system having flexible textile materials forming a conduit to transport fish across river barriers encountered during migration. The system can include modular support structures that can be independently secured to riverbeds to form conduit supports, dams, hydropower structures, and the like.

9 Claims, 30 Drawing Sheets

(56) References Cited

U.S. PATENT DOCUMENTS

| | | | |
|---|---|---|---|
| 2016/0160515 A1* | 6/2016 | Wallance | E04B 1/3483 52/79.1 |
| 2018/0291581 A1* | 10/2018 | Duquette | F03B 3/04 |
| 2019/0277000 A1* | 9/2019 | French, Sr. | A01K 61/95 |
| 2019/0316310 A1* | 10/2019 | Anders | E02B 9/022 |

* cited by examiner

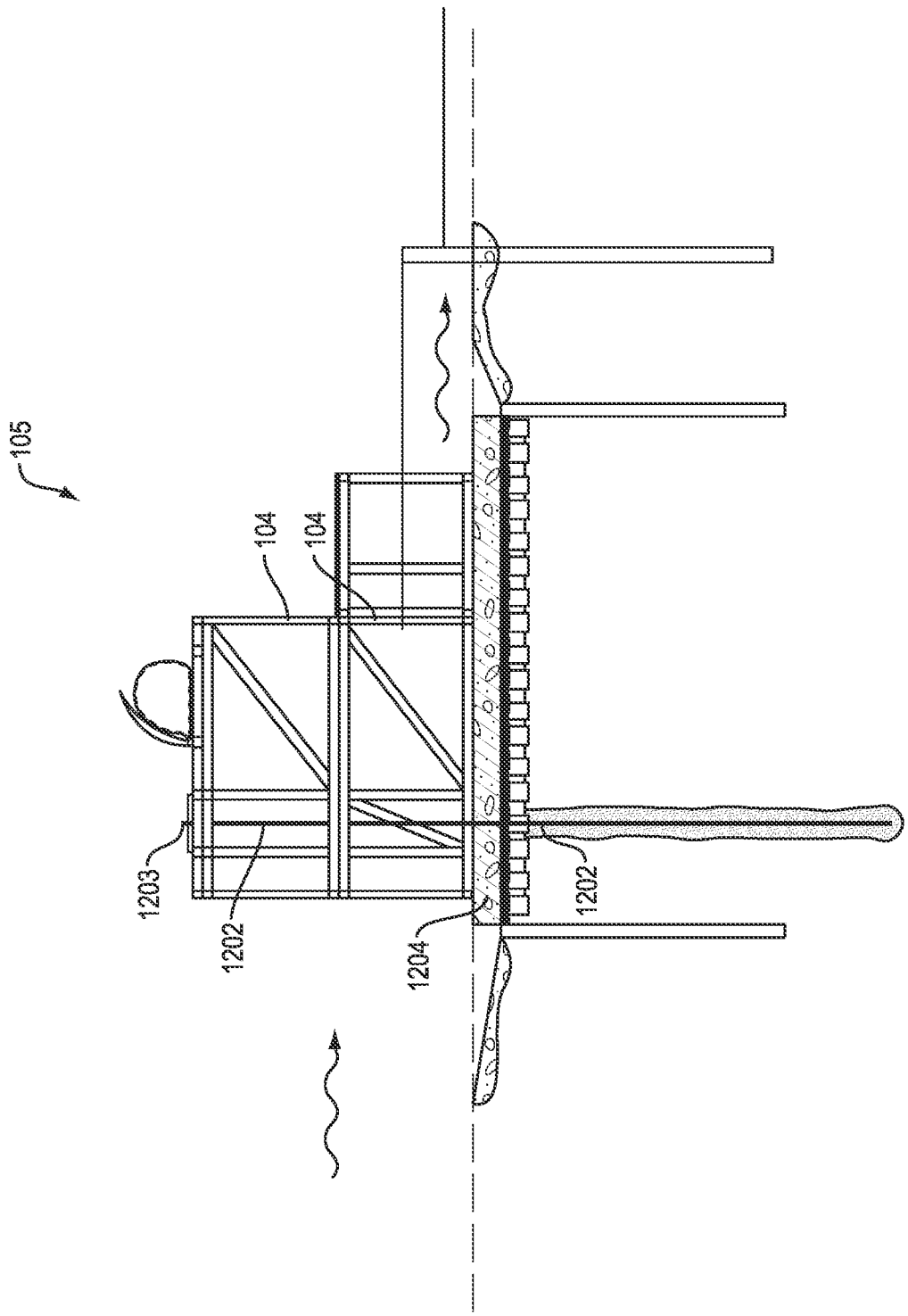

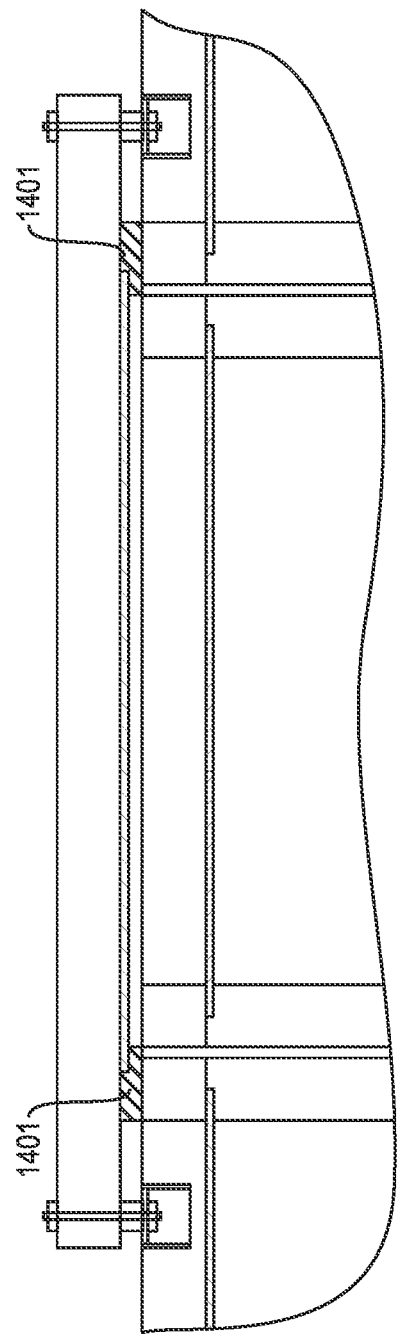

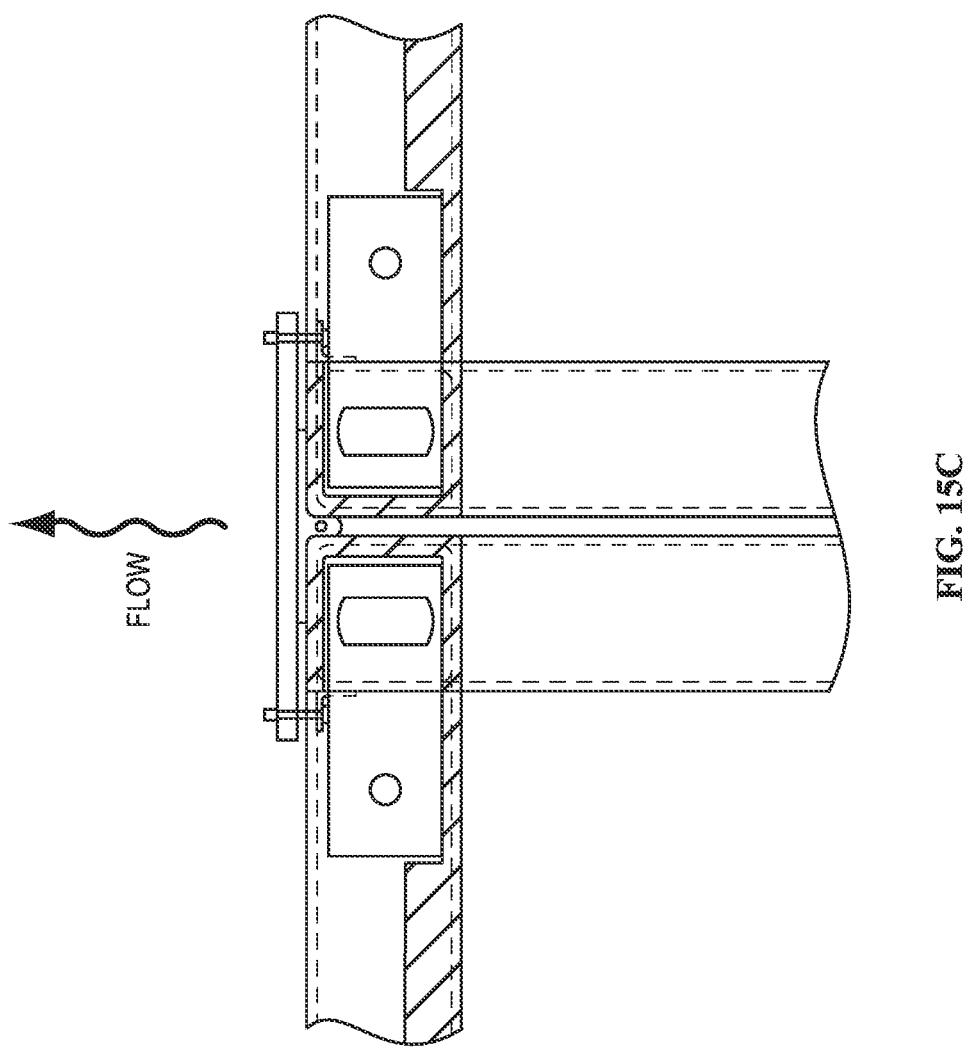

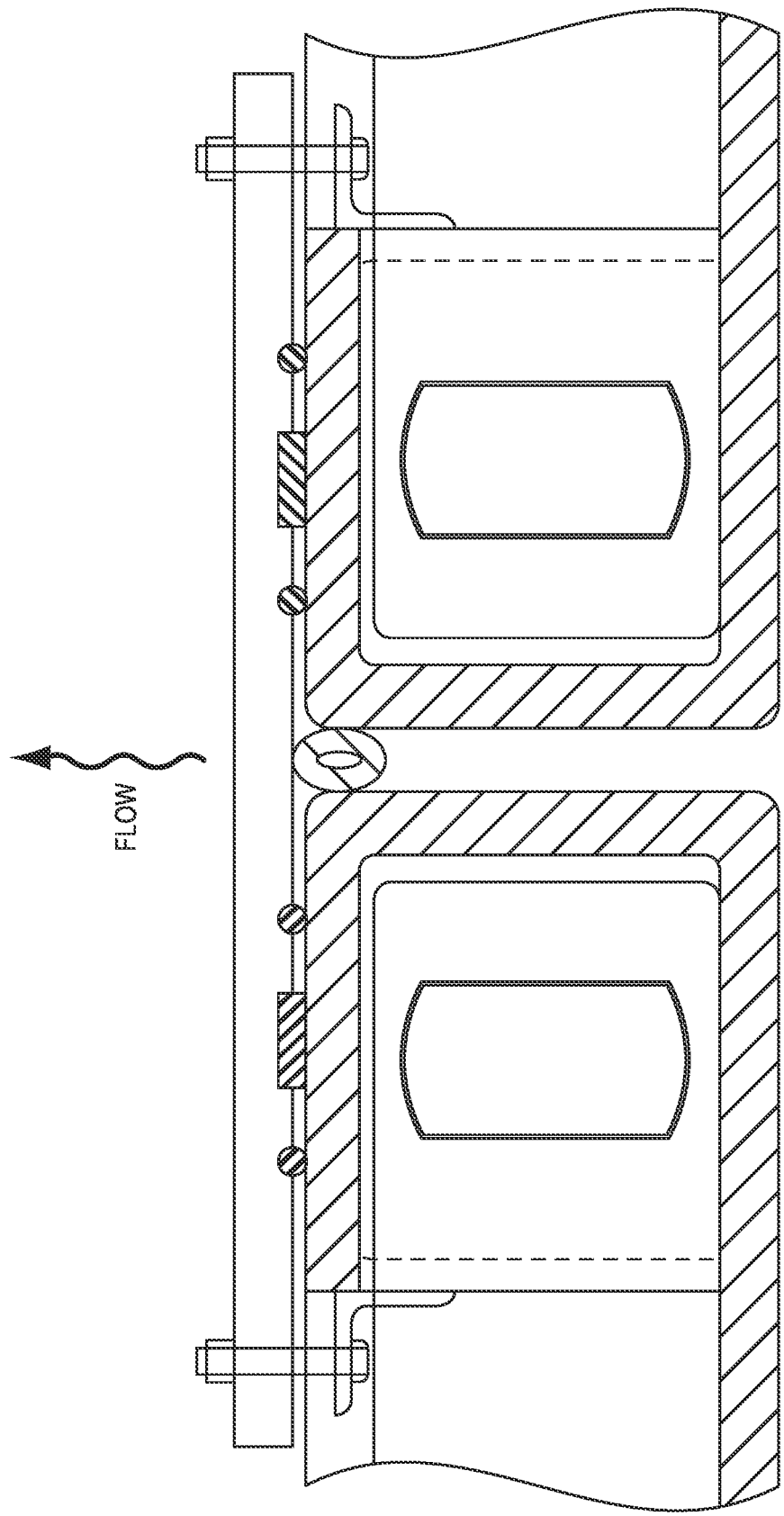

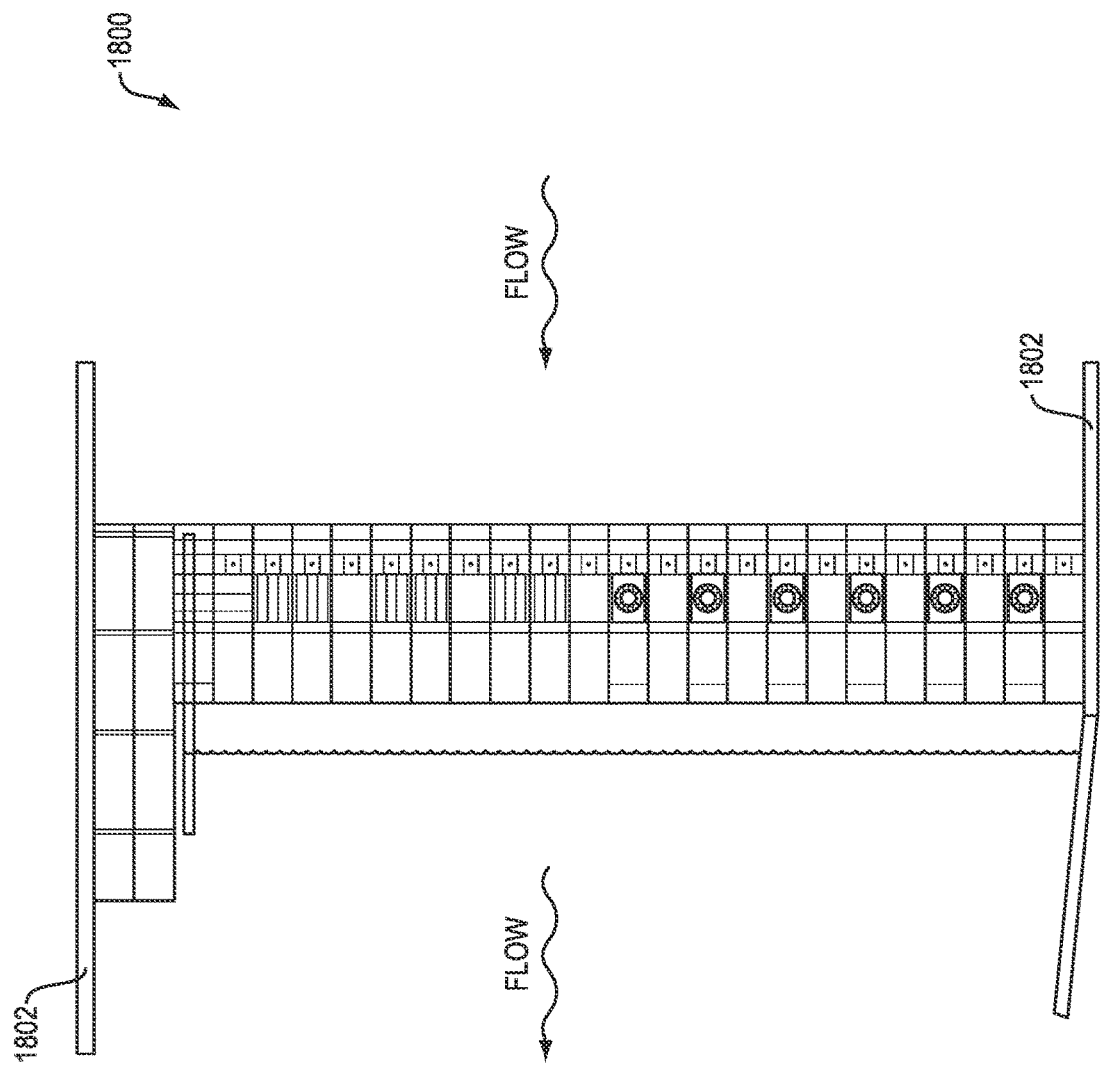

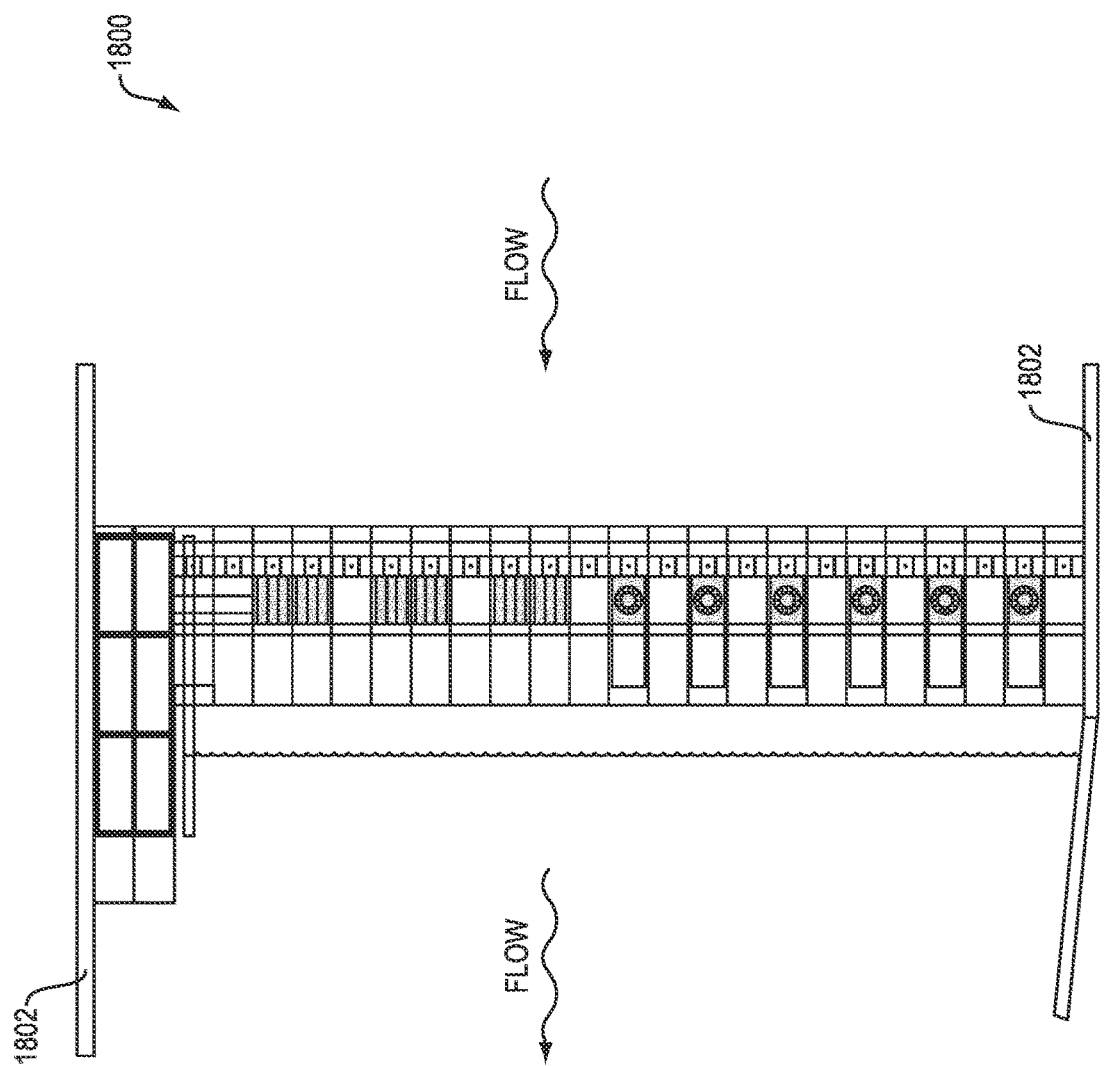

SCALED HYDROPOWER

CROSS-REFERENCE TO RELATED APPLICATIONS

This application claims benefit of priority from U.S. Provisional Patent Application Ser. No. 62/852,066, filed May 23, 2019, which is incorporated herein by reference in its entirety.

STATEMENT REGARDING GOVERNMENT INTEREST

This invention was made with government support under DE-EE0007243 awarded by the Department of Energy. The government has certain rights in the invention.

ADDITIONAL REFERENCES

U.S. Pat. No. 10,626,569 is hereby incorporated herein by reference in its entirety.

FIELD OF THE INVENTION

The present invention generally relates to fish passages for use with dams and hydropower, and more specifically to fish passages and scaled hydropower.

BACKGROUND

Hydropower or water power is power derived from the energy of falling or fast-running water, which may be harnessed for useful purposes. Since ancient times, hydropower from many kinds of watermills has been used as a renewable energy source for irrigation and the operation of various mechanical devices. In the late 19th century, hydropower became a source for generating electricity. Since the early 20th century, the term has been used almost exclusively in conjunction with the modern development of hydroelectric power. International institutions such as the World Bank view hydropower as a means for economic development without adding substantial amounts of carbon to the atmosphere, but dams can have significant negative environmental impacts. One of the most problematic environmental issues is blocked passage for migratory fish, particularly anadromous and catadromous species. Hydropower licensing agencies—such as the Federal Energy Regulatory Commission in the USA—routinely require as a condition of operation that safe, timely and effective fish passage equipment at any hydropower plant be provided for. The problem is that doing so in a manner that is acceptable to authorities and stakeholders is extremely expensive, especially at smaller hydropower facilities where it becomes a disproportionate part of project cost and as such can render such efforts financially unworkable. As such, a lower cost approach that is effective at passing fish safely is of the utmost importance to owners and developers of small hydropower installations.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a modular upstream fish passage system including an upstream portion having an entrance to a conduit, and a downstream portion including the conduit, the conduit having high-strength textiles to form a chute that hangs on structural supports.

One or more of the following features may be included. The conduit can have a sloping floor and a series of regularly spaced baffles to separate pools. The baffles protrude into the conduit and can be secured by textile gussets to walls of the conduit. The baffles can include baffle throughways to permit waterflow through the conduit. The upstream portion and the downstream portion are collapsible for storage and transport.

In another aspect, the invention features a downstream fish passage system including an upstream portion that includes an entrance structure, and an adjustable height conduit entrance port. A downstream portion can be linked to the upstream portion and attached to a downstream face of a dam with sacrificial connectors. The downstream portion can include a flexible textile conduit arranged in a spiral configuration around a central mast.

One or more of the following features may be included. The conduit is configured with inner and outer sections. At least one of the inner and outer sections is embedded smart fabric sensors, and are stiffened by rings. The conduit can include a plurality of access ports along the conduit that can be opened to remove debris and sediment, and to allow trapped air to escape.

In another aspect, the invention features a module system for building independent stacks of modules. The system includes multiple modules that can be vertically assembled to form one or more stacks. A post-tension anchor can secure each stack to a foundation on a streambed. However, each stack of modules is not structurally attached to any other stack.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIGS. 13A and 13B illustrate a section view of a water passage module stack configured in accordance with an embodiment of the present invention.

FIGS. 14 and 15A-15G illustrate exemplary seals implemented on module stacks in accordance with an embodiment of the present invention.

FIGS. 18A and 18B are illustrations of an exemplary small standardized prefabricated module hydropower ("SSPMH") facility.

DETAILED DESCRIPTION

Figure 1A:
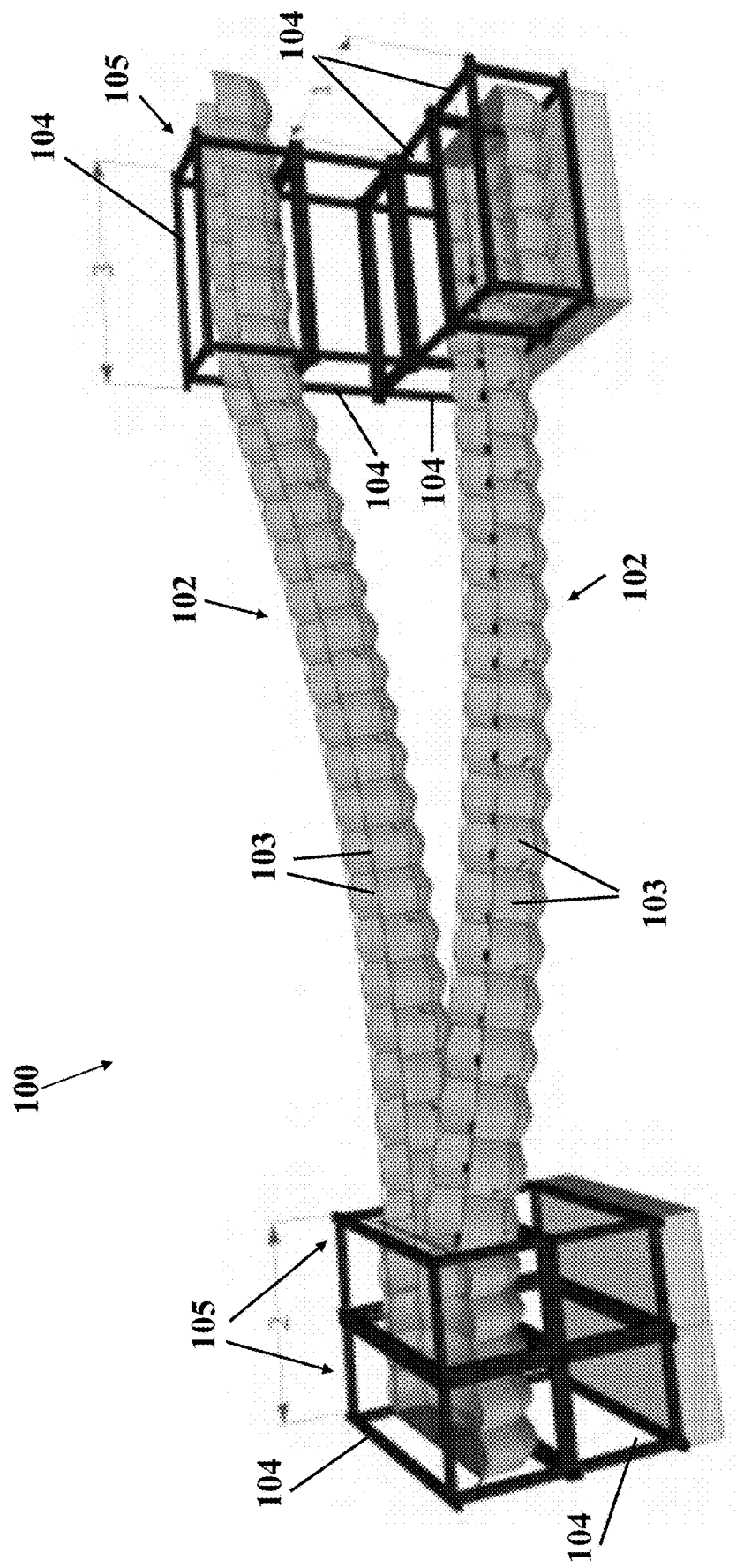
FIGS. 1A-1D illustrate an exemplary embodiment of a modular upstream fish passage system configured in accordance with the present invention.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Generally, in various embodiments, the present invention provides a fish passage system that can be easily assembled onsite and installed in a waterway, so that fish (e.g., salmon, shad and river herring) can overcome dams, hydropower facilities, and other obstacles encountered during migration. The fish passage can be disassembled and transported to and from sites. The disclosed fish passage system can be configured as a volitional or non-volitional passage depending on what ancillary attraction flow systems are utilized. Volitional fish passages can be defined as those that rely upon motivation, performance, and behavior of the fish to enter and ascend over the barrier, as opposed to non-volitional ones that rely on mechanical or human assistance such as lifts, elevators, fish locks, and trap-and-transport systems.

Referring to FIGS. 1A-1D, in an embodiment, the present invention provides an upstream fish passage system 100 that can include an expandable chute or conduit 102 supported by one or more modules 104 that provide a supporting structural framework. The conduit 102 has an upstream end through which fish exit the fish passage system 100, and downstream end through which fish enter the fish passage system 100. The conduit 102 can be made of flexible, high-strength textile materials including, but not limited to, high density polyethylene (e.g., Dyneema® or Spectra®), para-aramids (e.g., Kevlar®, Twaron®), meta-aramids (e.g., Conex®, Nomex®), high strength nylon (e.g., nylon 6,6, Cordura®), and reinforced rubber. The textile materials can be rubberized for water containment and can include additives for UV stabilization.

The conduit 102 can be configured as a series of interconnected pools 103. A series of baffles 106 can be disposed along the conduit 102 at regular intervals to separate the pools 103. Each baffle 106 can be adjustable in height and width to create a baffle throughway 107 between an end of the baffle 106 and an inside surface of the chute/conduit 102. In an embodiment, the baffles 106 can be attached and secured to walls of the chute/conduit 102 with textile gussets or other fasteners. The baffles 106 can be made of the same or similar textile materials as the conduit 102. The fish passage system 100 can be assembled on site from a pre-fabricated, standardized, and modular kit of parts. The kit of parts can be configured to accommodate various passage heights, e.g., from about 7 to about 50 feet.

In an embodiment, the modules 104 that support the chute/conduit 102, as well as system 100 generally, can be configured as structural steel frames with overall size and dimensions of a standard intermodal shipping container. For example, in an embodiment, each module 104 is 8' wide, 9.5' high and 20' long and can be oriented with the long axis parallel to river flow. The modules 104 can be used as building blocks to assemble various structures, such as, the structural frames to support the conduit 102 and system 100. The modules 104 can be stacked on top of each other to a desired height and attached together, vertically and/or horizontally, with bolted structural connections or other fasteners. The modules 104 can also be used to build dam-module stacks, spillway-module stacks, and turbine-module stacks to assemble a modular hydropower installation. In an embodiment, each stack 105 of modules 104 is individually secured to a foundation on a streambed using a post-tension anchor, but each stack 105 is not secured or affixed to adjacent stacks 105. This independent stack configuration allows for easy modification, replacement, and maintenance of structures utilizing stacks 105. In an embodiment, a compressible gasket of neoprene or similar material can be used to seal all interface and contact points between modules 104, stacks 105, foundations and other interfaces or joints. The compressible gasket can be sized to be positioned between modules and interfaces on the downstream side of a particular structure.

In operation, initially modules 104 and stacks 105 of modules 104 can be arranged and secured at desired locations and heights to adjust the slope of the conduit 102 based on design specification requirements, topographical constraints, flow volume, flow rate, type of fish, etc. The conduit 102 can then be expanded and supported between the structural framework, and the baffles 106 can be installed and adjusted as desired along the length of the conduit 102 in each pool 103. Water entering the upstream end of the conduit 102 flows through the interconnected pools 103 via the baffle throughway 107 in each baffle 106. Fish entering the downstream end of the conduit 102 traverse the pools 103 and oncoming water in the opposite direction via the baffle throughway 107 in each baffle 106. Upon exiting the system 100, the fish are deposited upstream of the obstacle or barrier in the waterway.

Figure 1B:
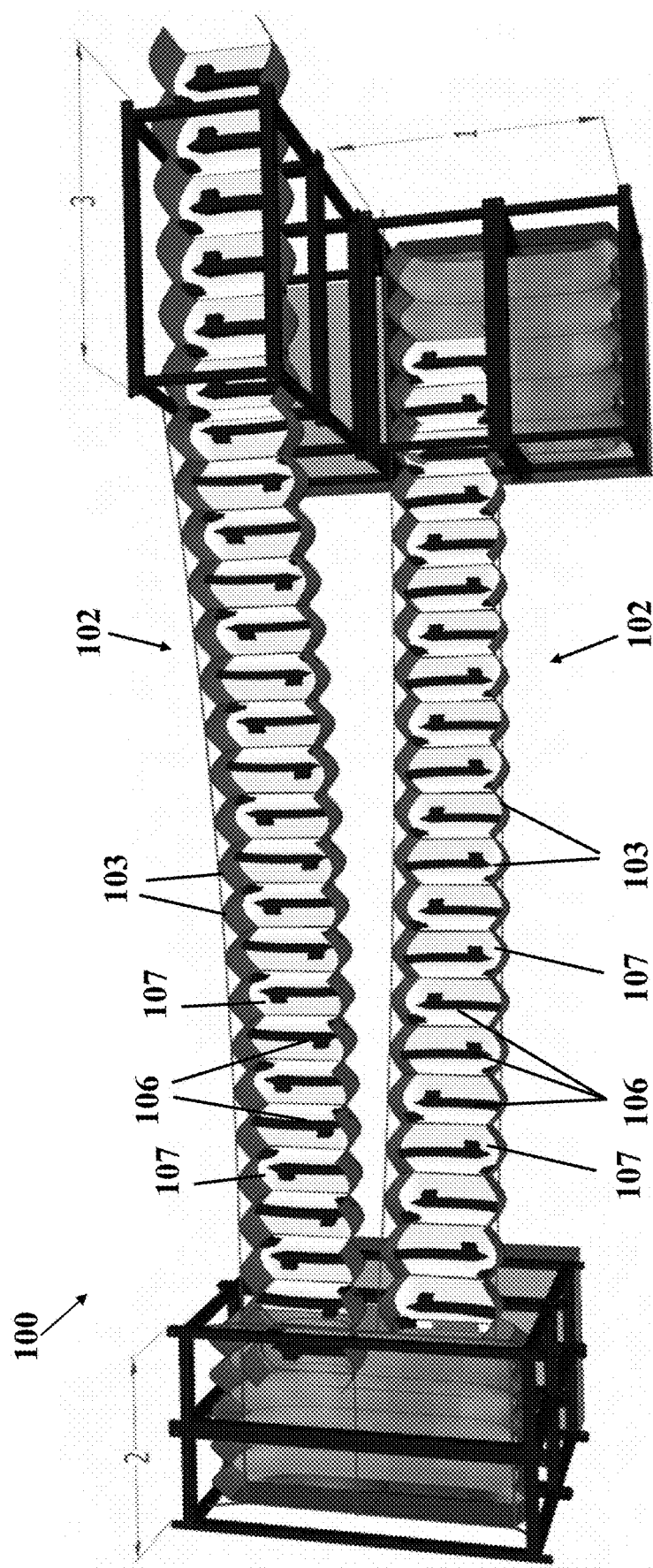
Figure 1C:
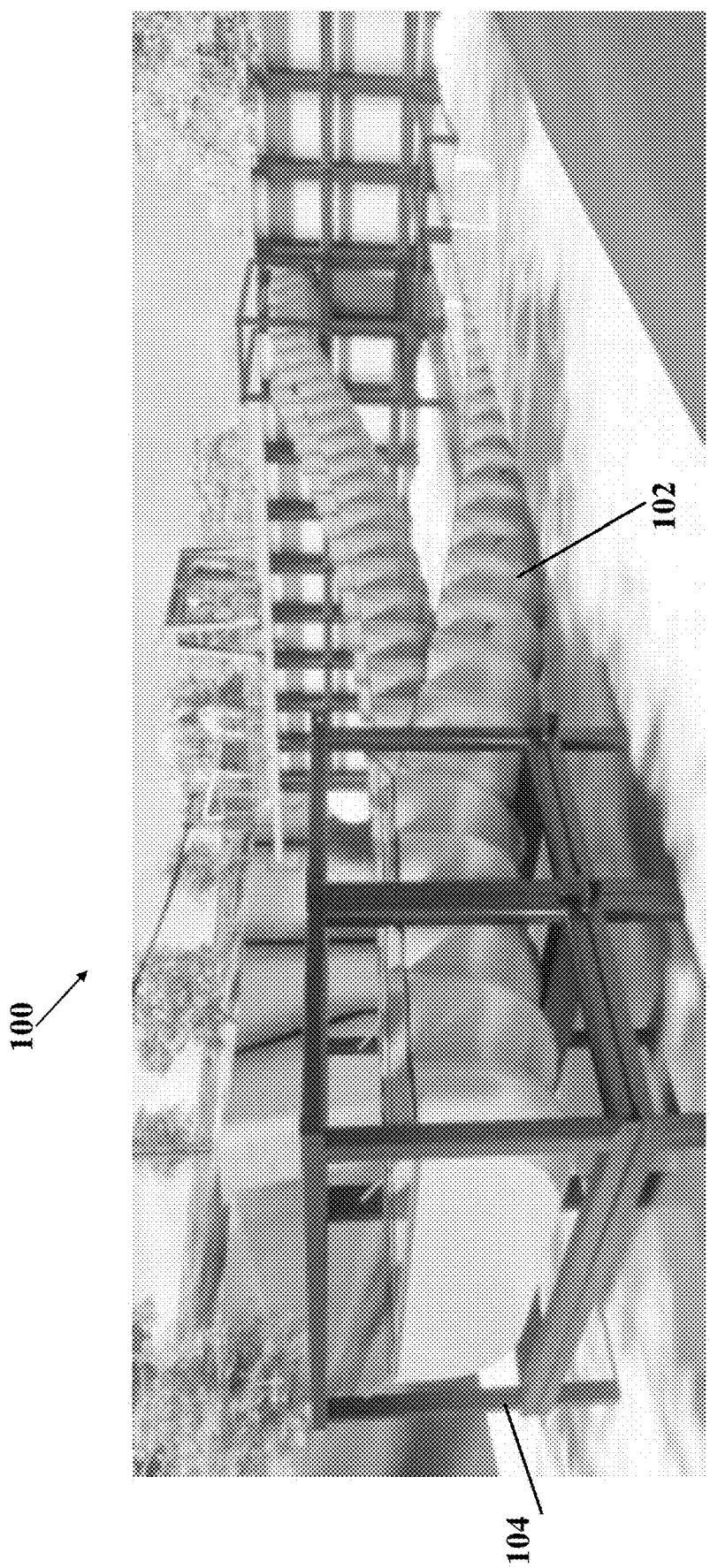
Figure 1D:
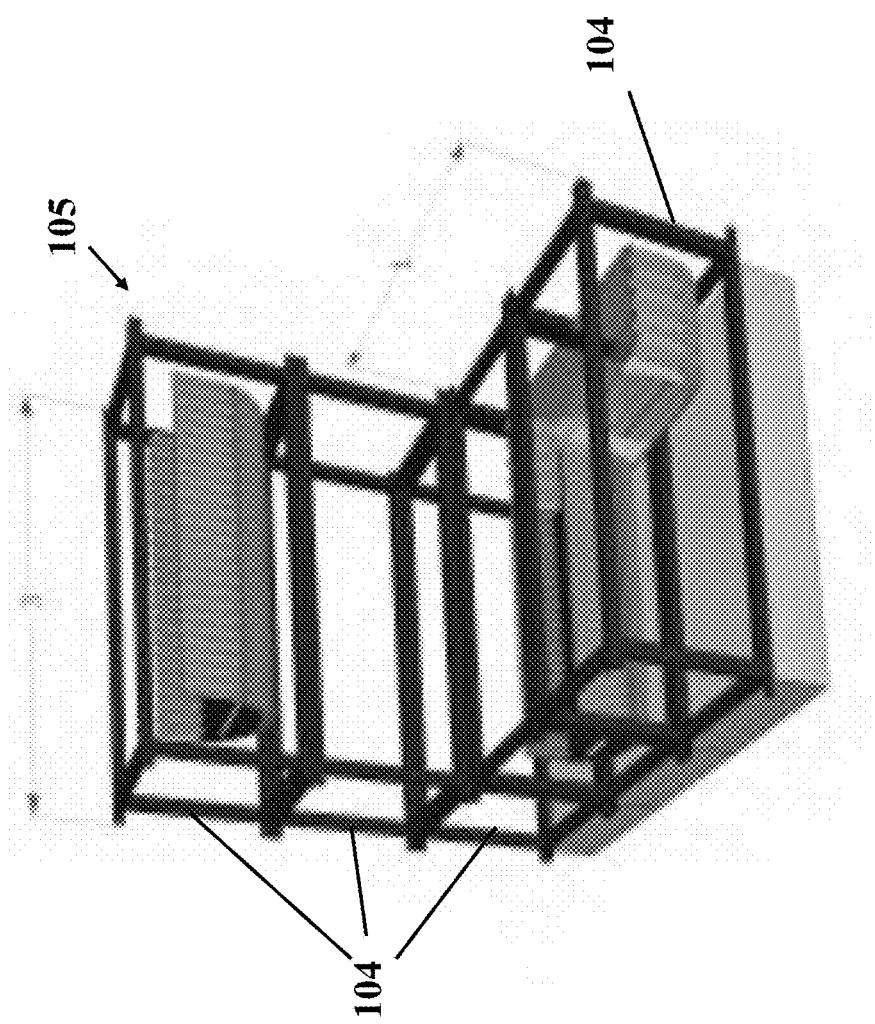

FIGS. 1A-1C depict the conduit 102 extending linearly between endpoints; however, it should be appreciated that this depiction is for illustration purposes only. The system 100 is modular and the conduit 102 is made of flexible textile materials, so the system 100 can be adjusted to accommodate for modifications, topographical conditions, type of fish species, and site conditions. In other words, the conduit 102 can be expanded and arranged in various shaped paths along the site terrain, and modules 104 can be added to or removed from stacks 105 to adjust the slope and layout of the system 100. For example, pools 103 can be made larger or smaller by adjusting or replacing a portion of the textile fabric, the baffles 106 can be adjusted to increase or decrease the size of the baffle throughway 107, the chute/conduit 102 can be replaced with chutes/conduits 102 having different size to adjust for the overall width or depth of water. The entire system 100 can be disassembled, moved to another site, and reassembled.

Figure 2:
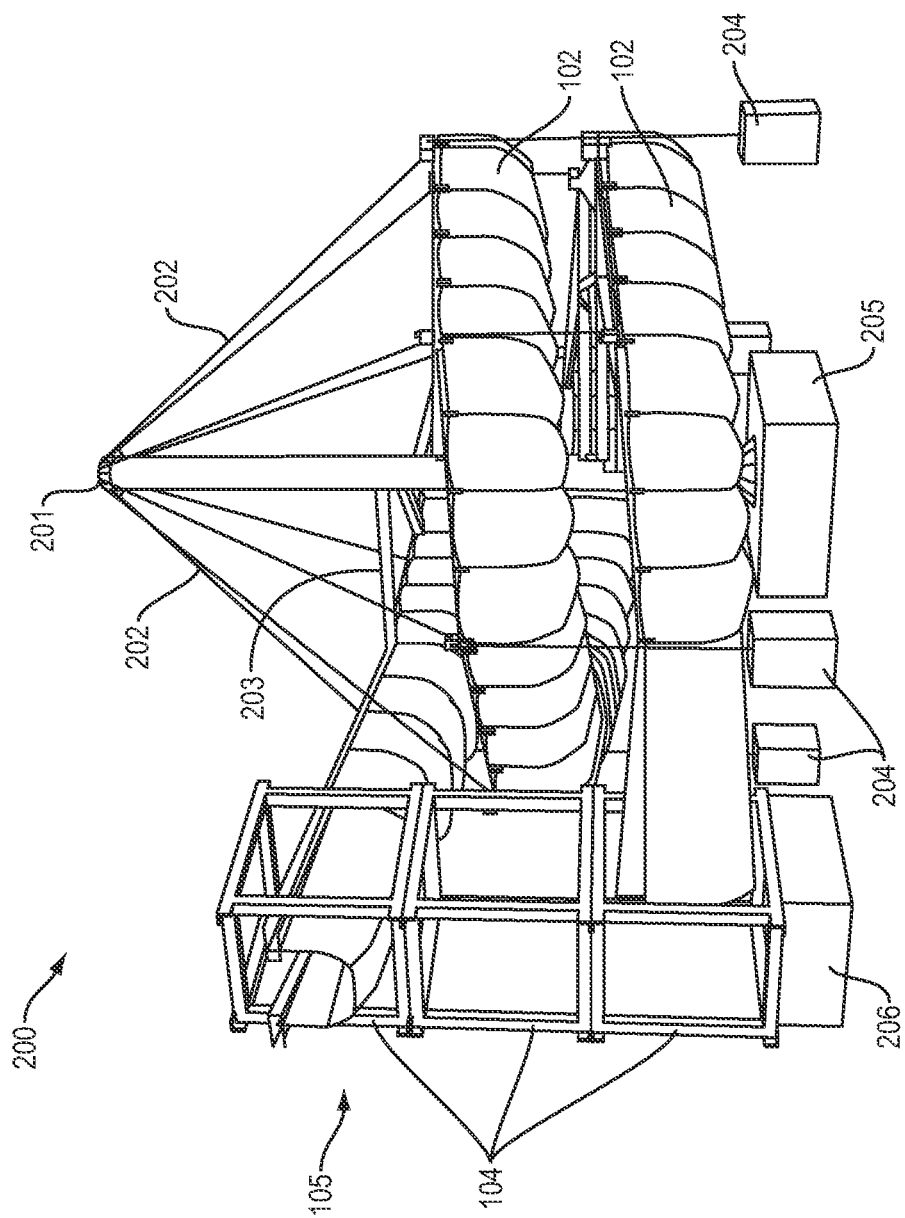
FIGS. 2-4 illustrate another exemplary embodiment of a modular fish passage system configured in accordance with the present invention.
Figure 3:
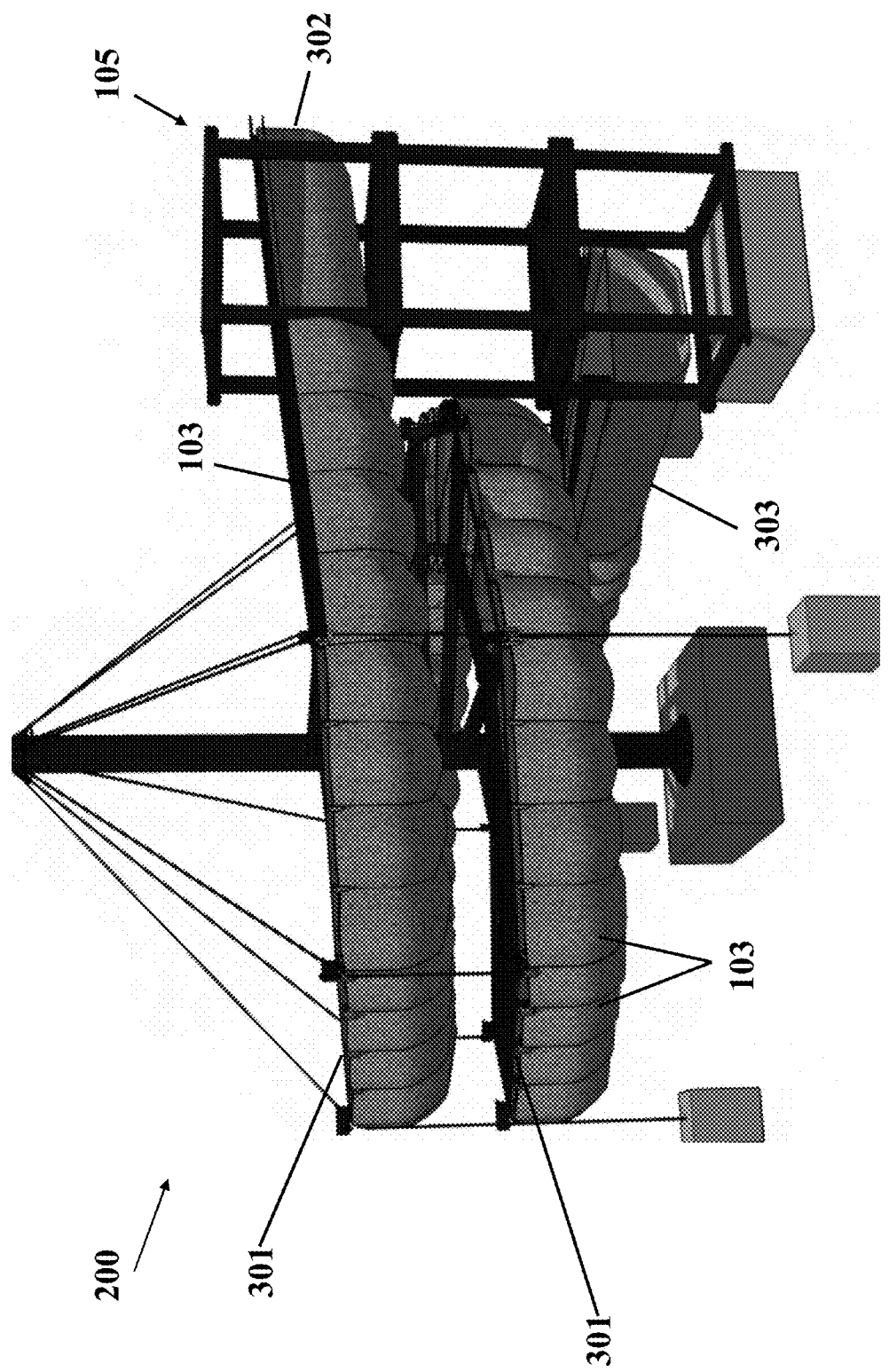
Figure 4:
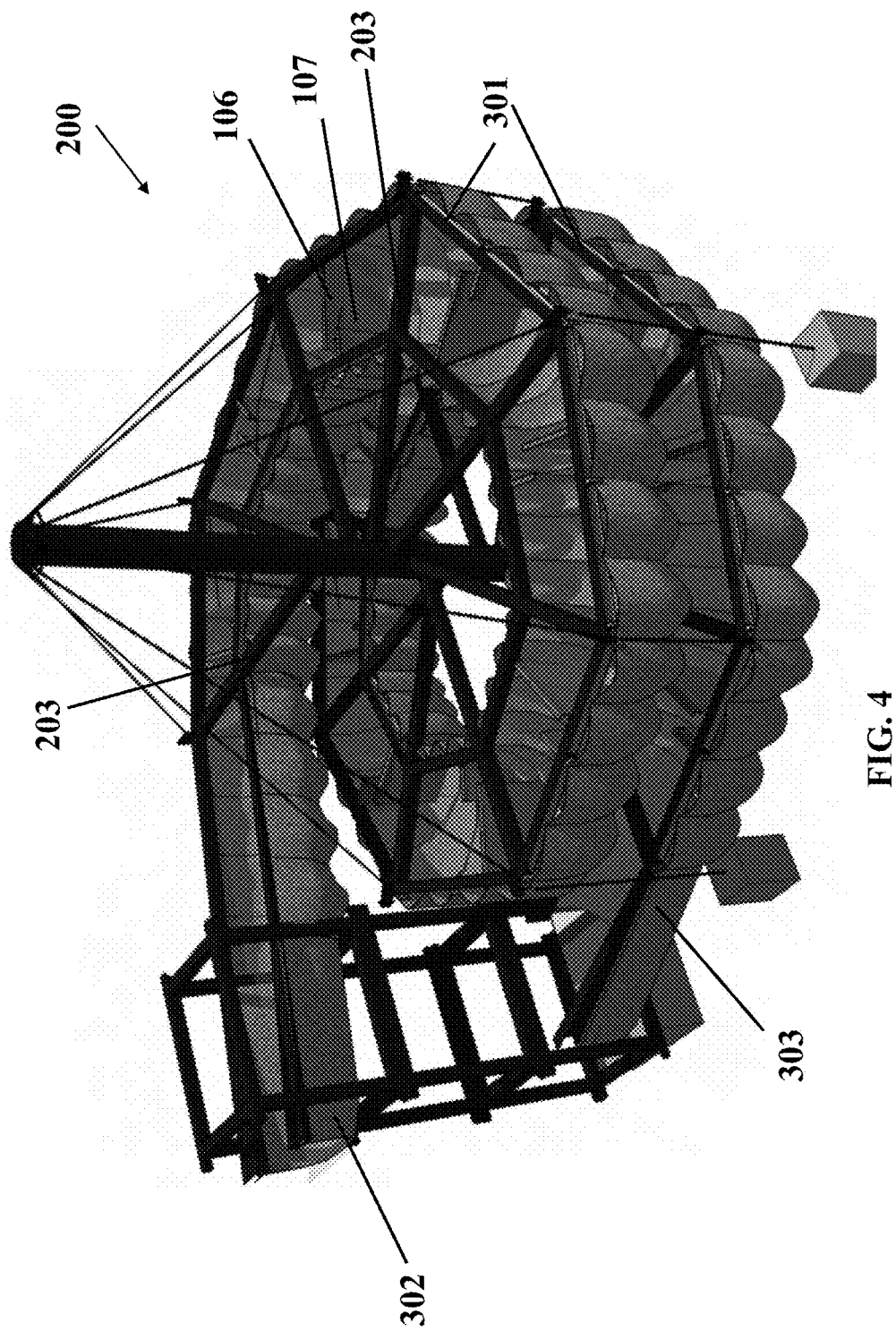

Referring to FIGS. 2-4, in another embodiment, an upstream fish passage system 200 can be installed in a spiral configuration that maintains a small footprint. Specifically, the flexible chute/conduit 102 can be spiraled into position about a central column 201 and supported in place by structural supports. In an embodiment, the fish passage 200 can include a center column 201 supported on a concrete footing 205, suspension tethers/cables 202, horizontal strut beams 203, ground anchors 204, stack footing 206, chute/conduit 102, pools 103, channel edge supports 301 for securing baffles 106, upstream end 302 of conduit 102, and downstream end 303 of conduit 102.

In one exemplary embodiment, the center column 201 is a 40 ft. tall, 12" diameter steel pipe with ½" wall thickness. It attaches to a concrete footing 205 roughly 11'×11'×4' thick. A bolted connection is used so fasten the column 201 to the footing 205 so that the connection can be disassembled if necessary. The chute/conduit 102 can be 8' wide and 5' deep and capable of supporting water to a depth of 4.5'. The conduit 102 and baffles 106 can be supported and secured on the channel edge supports 301, which can be made of 8" square steel tubing having about 0.375" to 0.5" wall thickness. The edge supports 301 are beams, i.e., loaded in flexure. The chute/conduit 102 is suspended from the center column 201 using suspension tethers/cables 202, which extend from the top of the center column 201 and attach to the channel edge support 301 and to horizontal strut beams 203. The suspension tethers 202 can be a ⅝" diameter wire rope or solid rod. The horizontal strut beams 203 can be an 8"×8" square structural steel tubing with ½" wall thickness. The entire structure can be stabilized with ground anchors 204. Fish passage systems 100, 200 can be easily assembled, disassembled, and stored in a support module 104 during transport to other sites (see FIG. 1D).

In addition, many fishways include an auxiliary water pipe to provide attraction flows. The small footprint of the fish passage system 200 allows for an auxiliary pipe to be installed from the upstream end 302 of conduit 102 and extending down through the open center area of the spiral configuration. This water pipe can be made of flexible textile materials and can be detached along with the chute/conduit 102 and stowed for protection during high floods.

Figure 5:
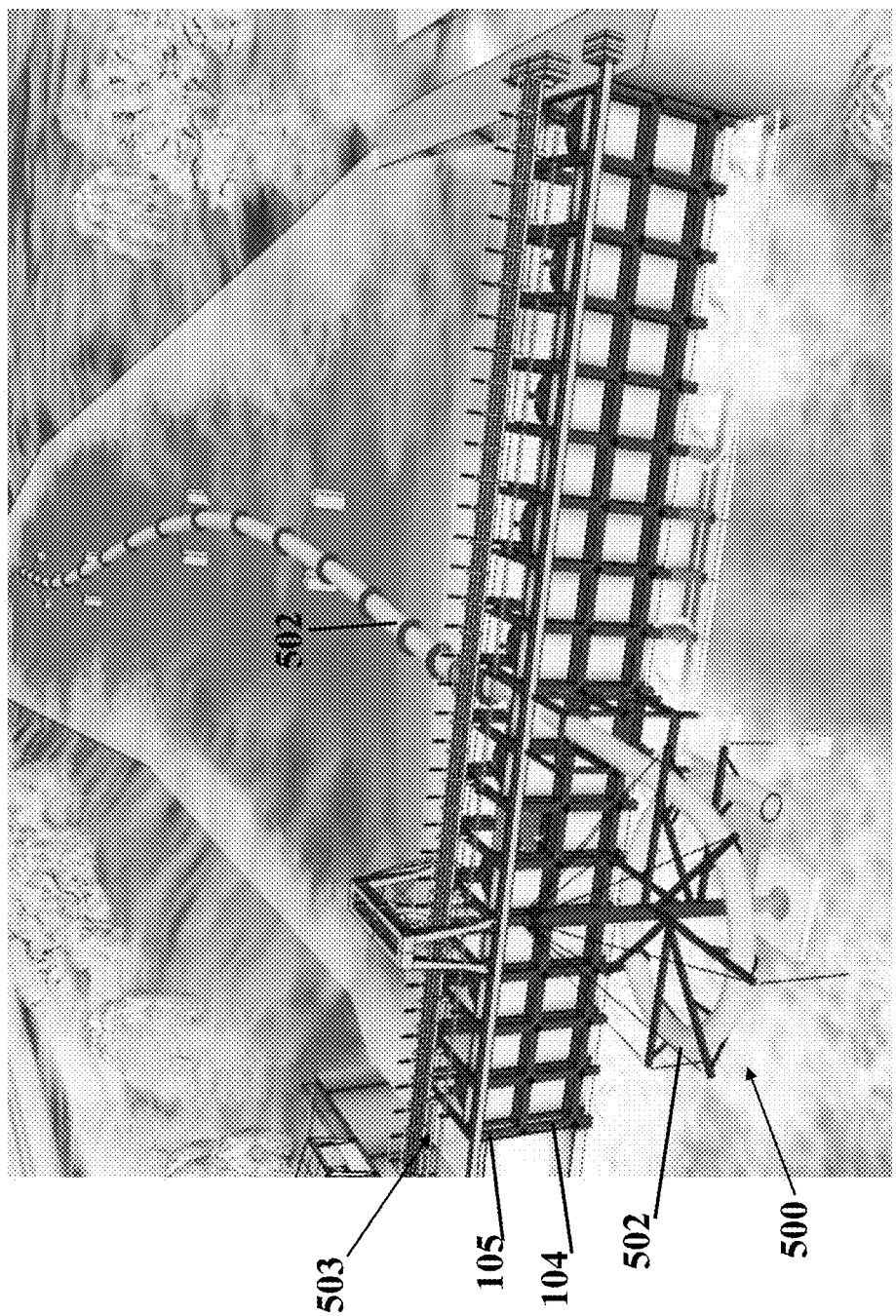
FIG. 5 illustrates an exemplary downstream fish passage system implemented on a dam.

Referring to FIG. 5-10, in another embodiment, a downstream fish passage system 500 can be positioned with a fish entrance 601 upstream of the dam and the exit end of the conduit 502 on the downstream side of a dam 503 with sacrificial connectors, such that, in an emergency overtopping event, the fish passage system 500 does not contribute to the structural load of the dam 503. The system 500 can include a conduit 502 configured as an enclosed tube along its length. As with embodiments discussed above, the conduit 502 can be made of textile materials. The conduit 502 can be propagated over and upstream of the dam 503. The dam 503 as illustrated in FIG. 5 is made of stacks 105 of modules 104; however, it should be appreciated that the fish passage system 500 can operate with any dam or river barrier regardless of what material (e.g., concrete, stone, wood) it is made of.

The fish entrance 601 of the conduit 502 can be releasably attached to a module 104 that is secured to a riverbed via a concrete footing 605 and a post-tension anchor. The fish entrance 601 can be oriented to face upstream so that fish traveling downstream can easily enter the conduit 502 via the fish entrance 601. The conduit 502 can include access ports 602 along its length that can be opened to remove debris and sediment, and to allow trapped air to escape. The access ports 602 can be made of textile materials. The conduit 502 can also include stiffening rings 604 along its length to retain the shape of the conduit 502 to keep the fish entrance 601 open. The stiffening rings 604 can be secured to the riverbed with mooring lines 603 and ground anchors 204.

Figure 6:
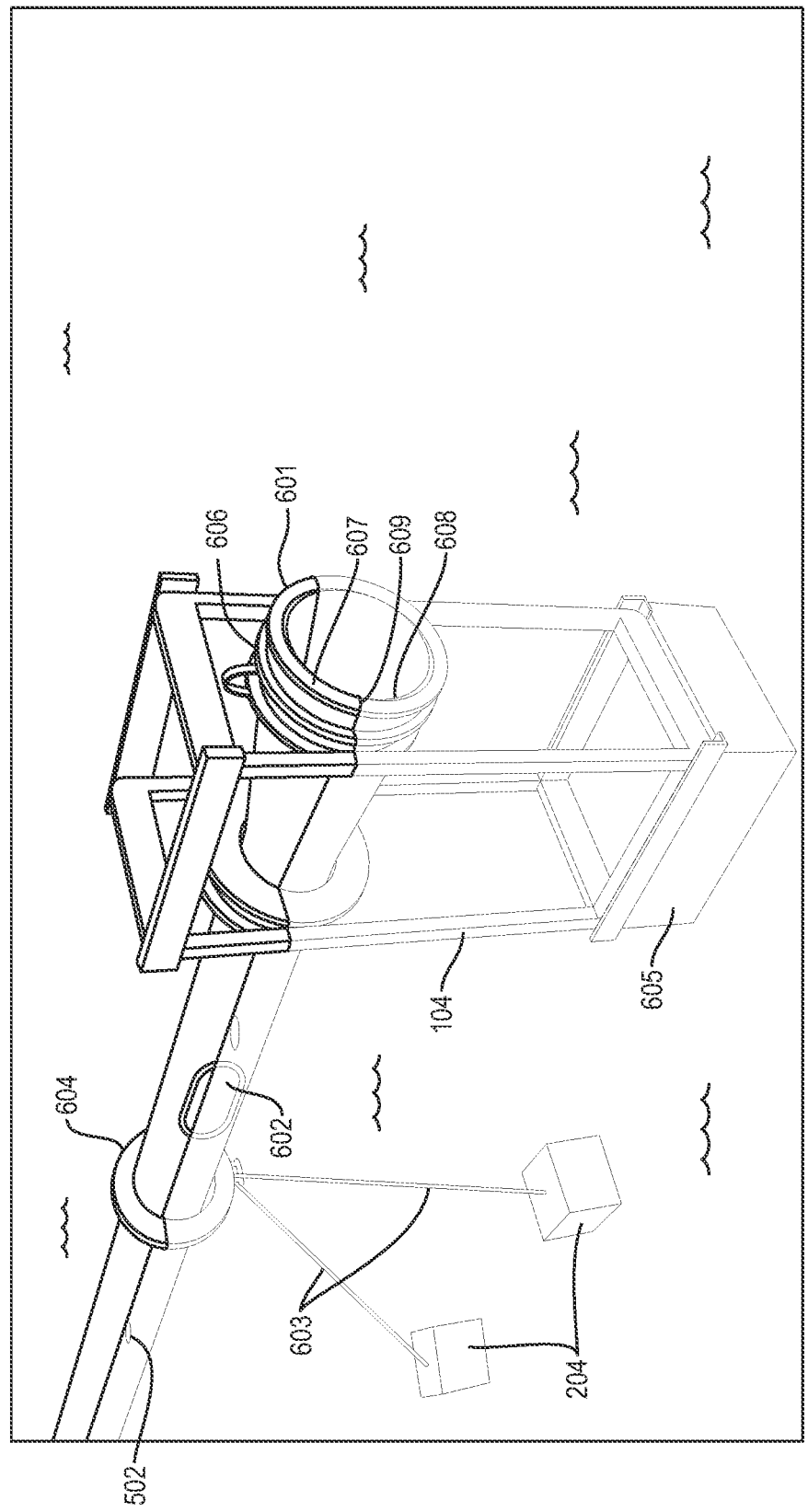
FIGS. 6 and 7 illustrate features of a conduit configured for use with an embodiment of the fish passage system of FIG. 5.
Figure 7:
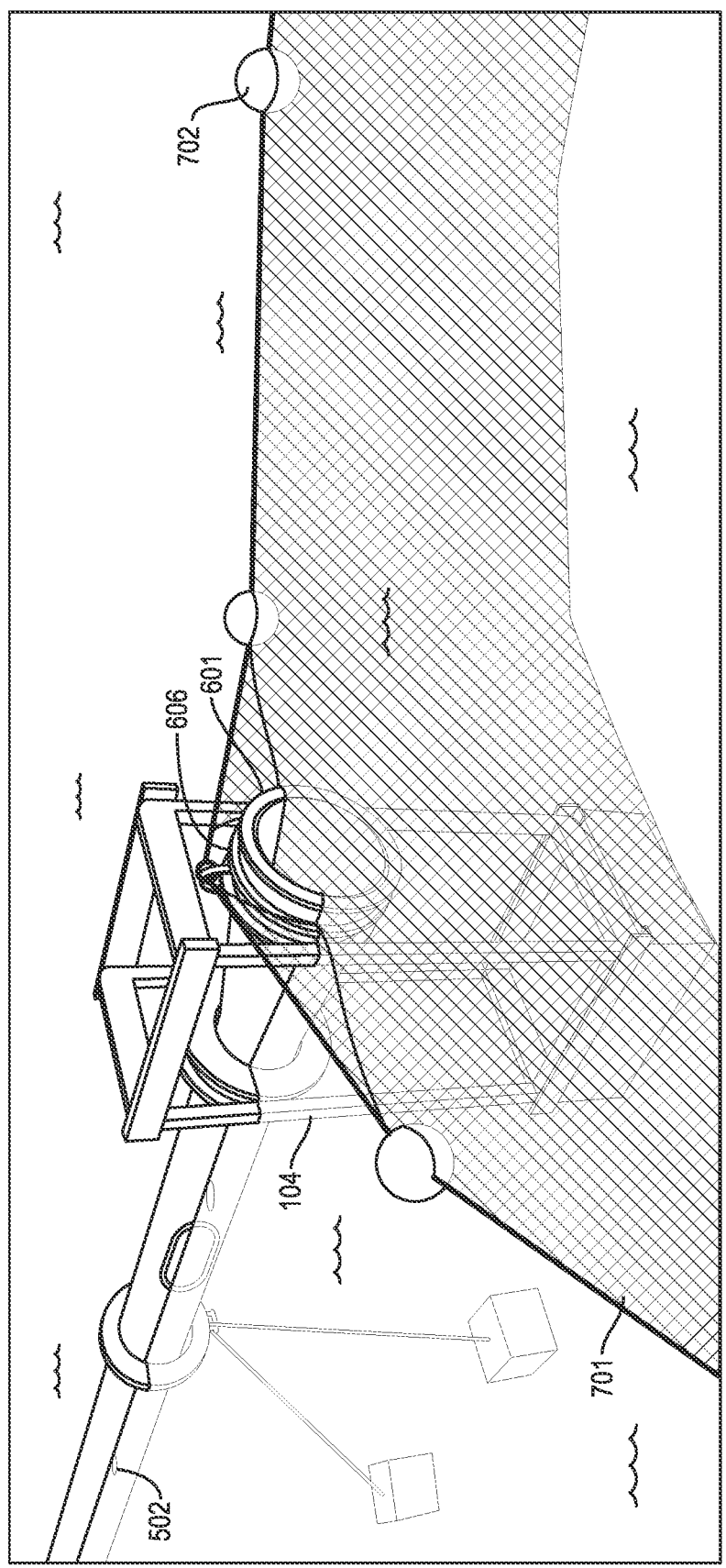
Figure 8:
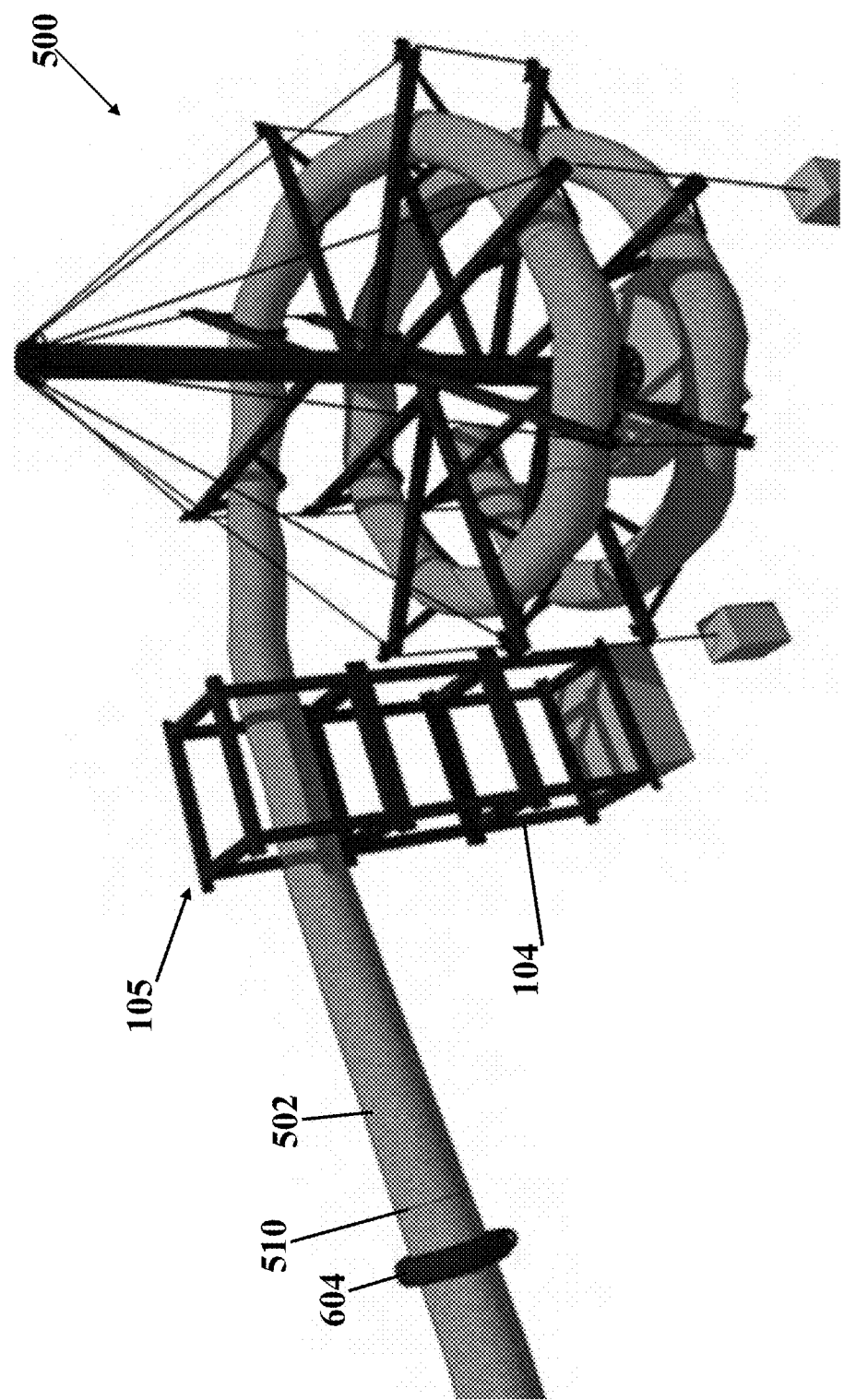
FIGS. 8 and 9 illustrate different views of an embodiment of the downstream fish passage system of FIG. 5.
Figure 9:
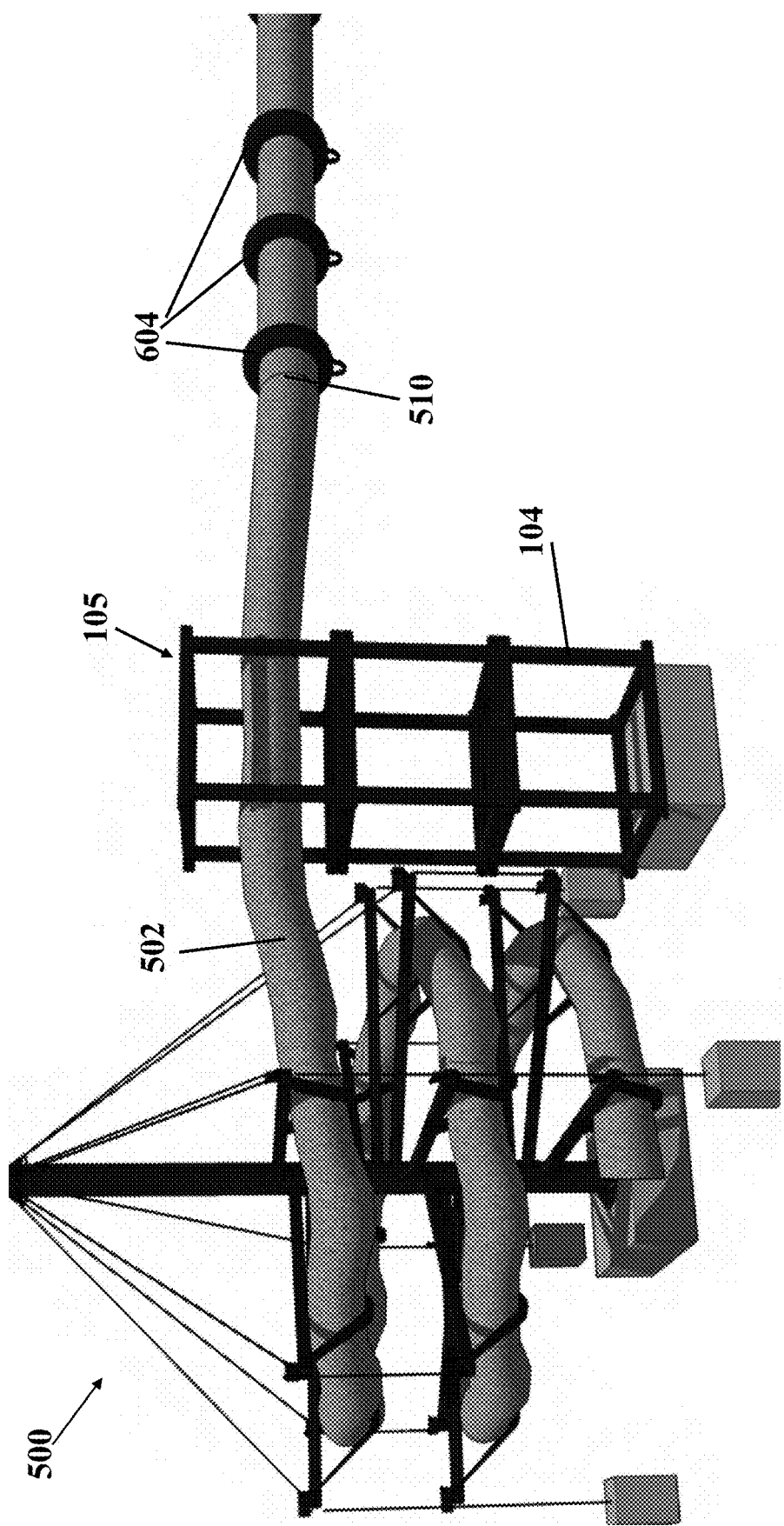

Certain species of fish, such as, Atlantic salmon smolts, American shad and blueback herring, swim near the surface. Therefore, the conduit 502 and fish entrance 601 can be positioned near the top of the module 104 to interact with migrating fish. Specifically, as shown in FIG. 6, a top portion 607 of the conduit 502 and fish entrance 601 can be maintained above the water line 609, and a bottom portion 608 of the conduit 502 and fish entrance 601 can remain below the water line 609. Floats, such as, buoys 702, can be attached to the stiffening rings 604 and to a guide ring 606 so that the conduit 502 and fish entrance 601 "float" on the surface and move up and down with changing water levels. As shown in FIG. 7, in an embodiment, an extension net 701 supported by buoys 702 can be secured about the fish entrance 601 and surrounding area to funnel as many fish as possible into the conduit 502. In other embodiments, exclusion nets can be utilized to prevent fish or certain species of fish from entering the fish entrance 601 and conduit 502. In other embodiments, a pump can be utilized to generate flow near the entrance 601 to attract fish to the entrance 601.

Figure 10:
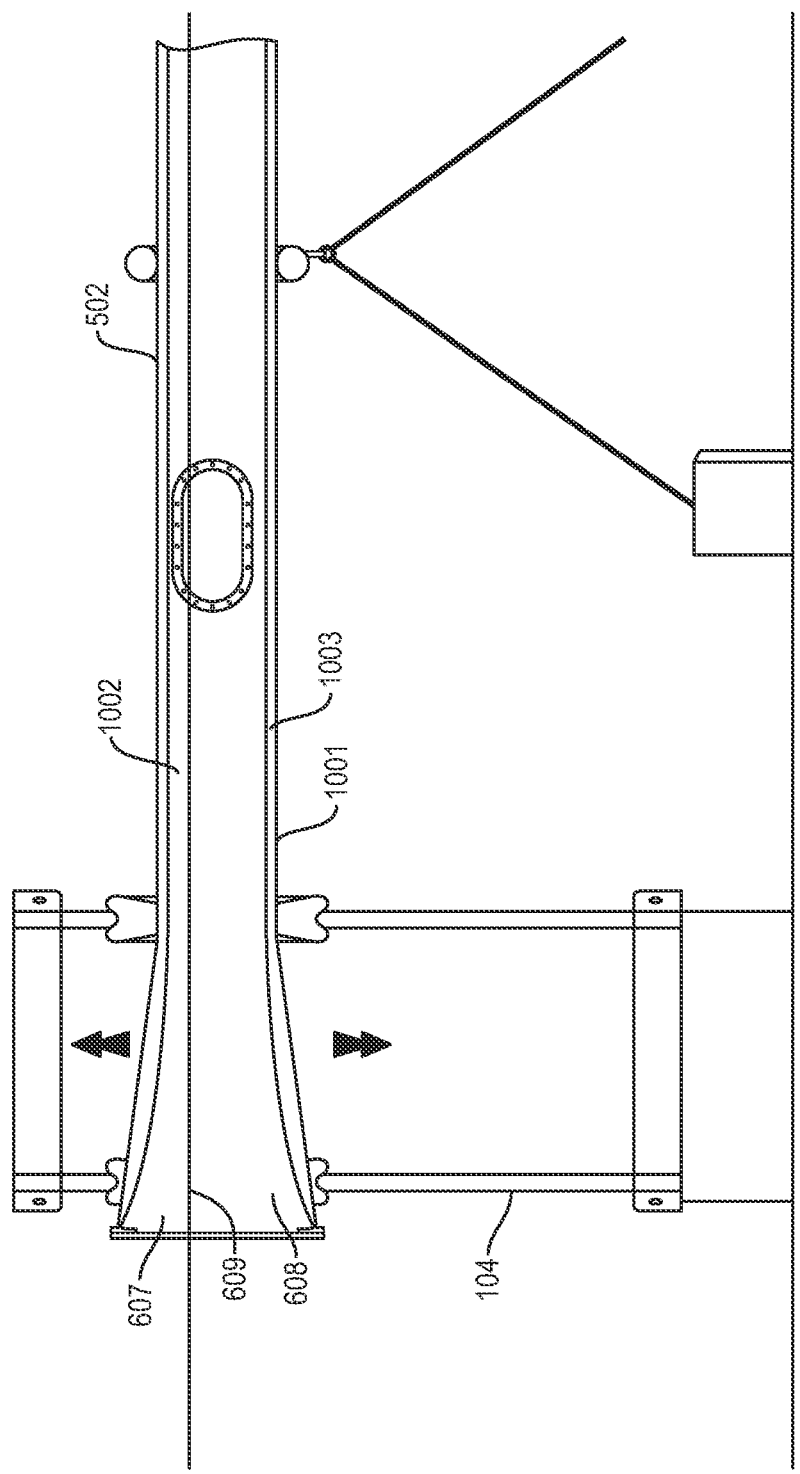
FIG. 10 illustrates features of a conduit having inner and outer tube sections, and configured for use with an embodiment of the fish passage system of FIG. 5.
Figure 11:
FIG. 11 is an illustration of an exemplary small module hydroelectric facility configured in accordance with an embodiment of the present invention.
Figure 12A:
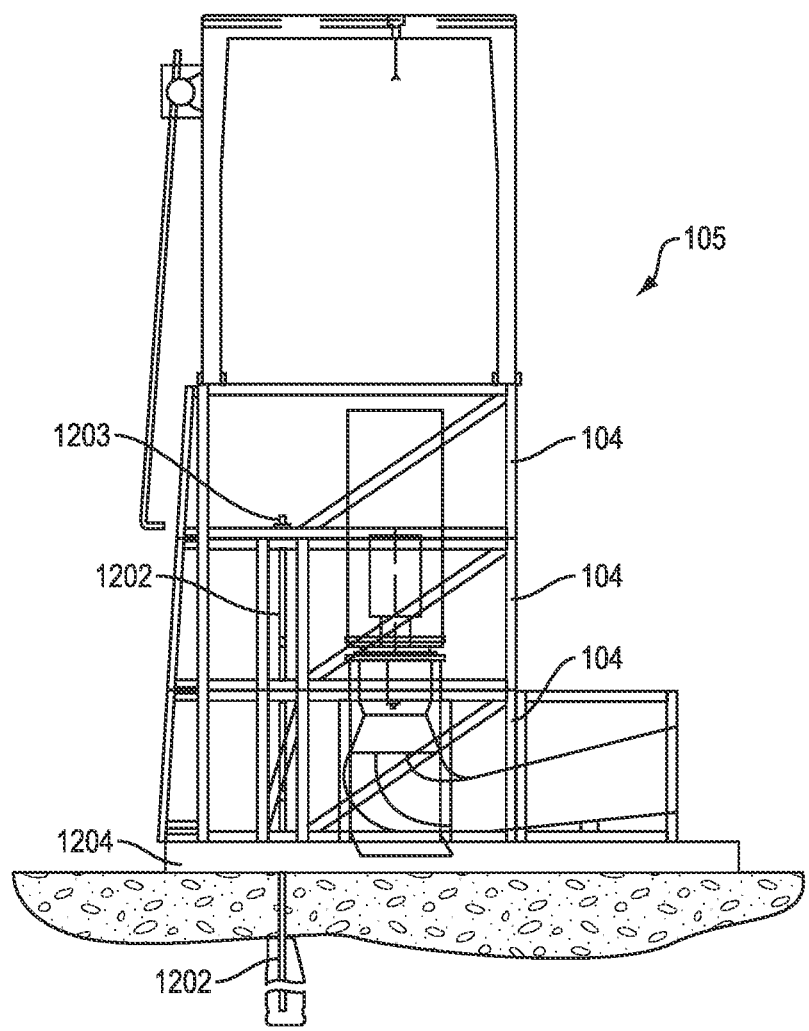
FIGS. 12A and 12B illustrate a section view of a generation module stack configured in accordance with an embodiment of the present invention.
Figure 12B:
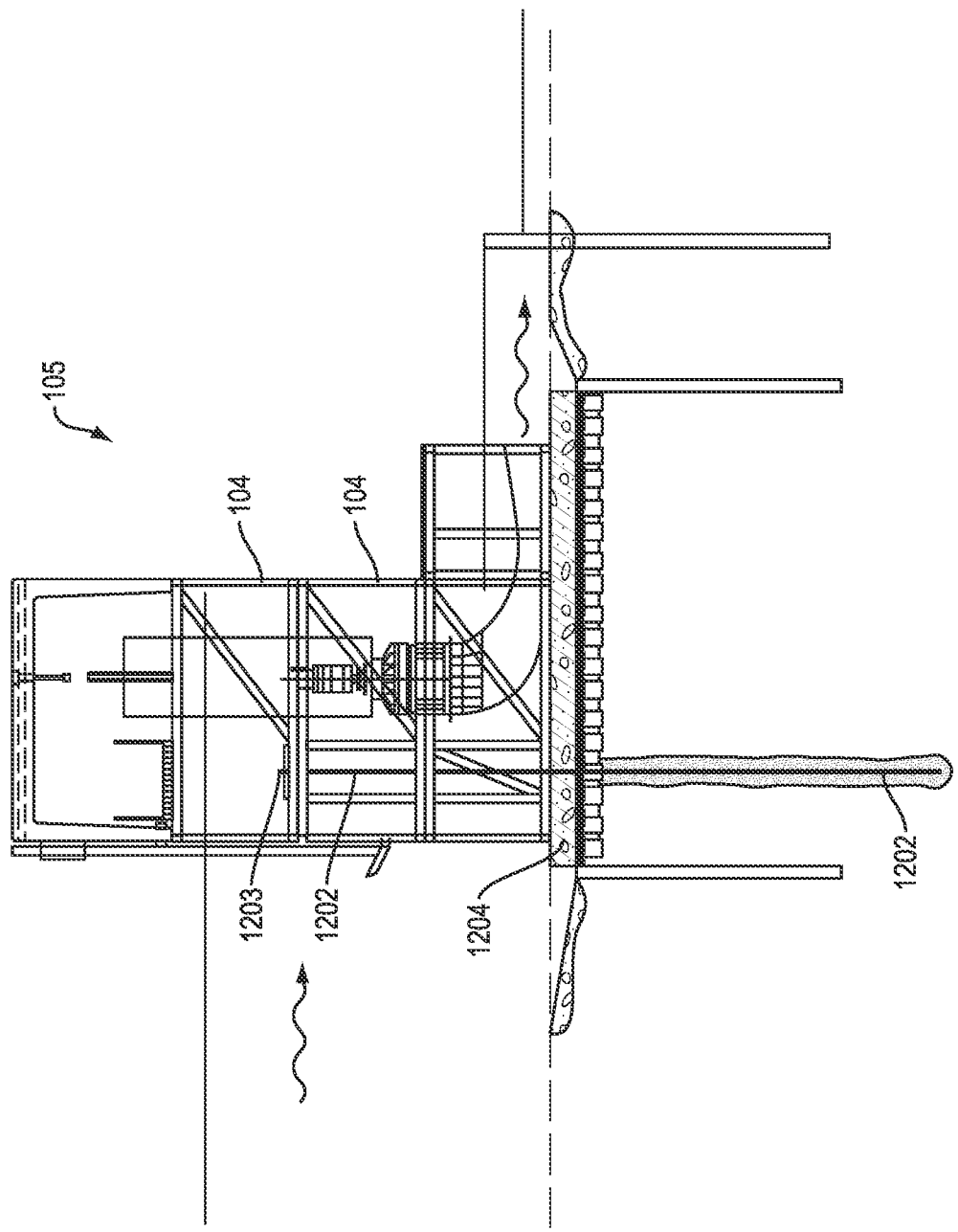
Figure 13A:
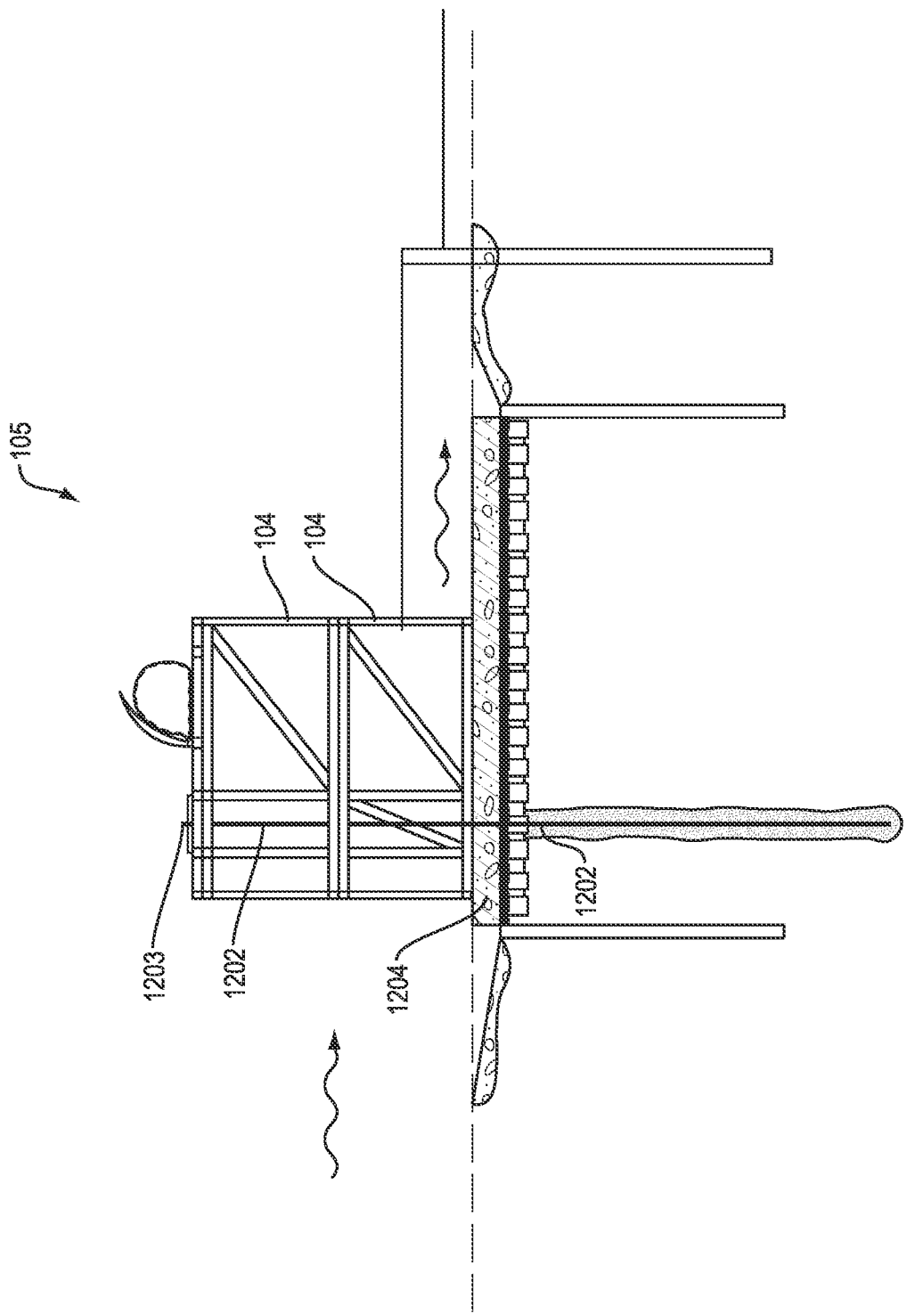
Figure 15A:
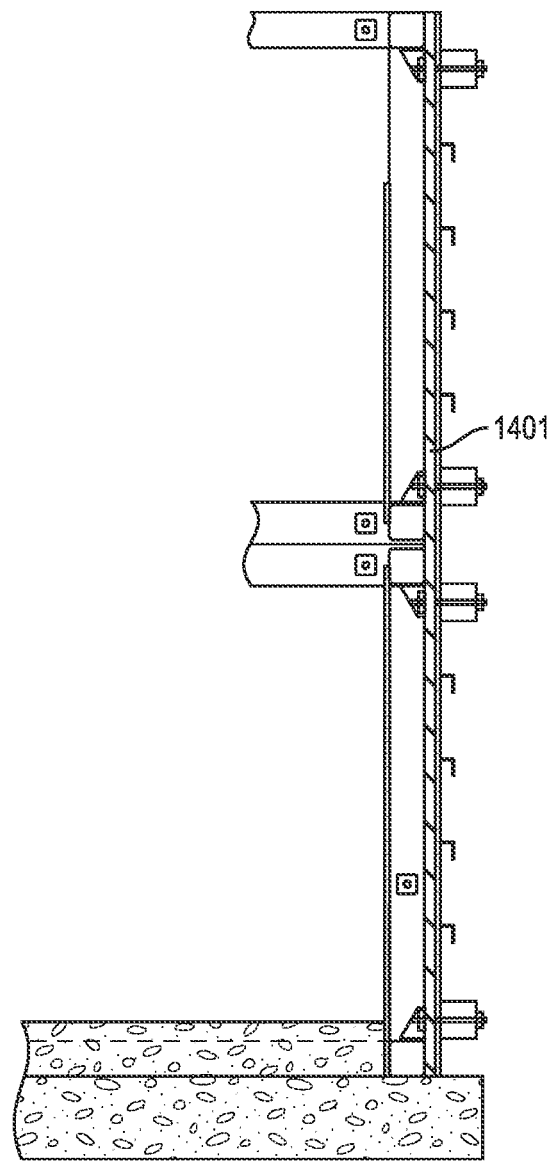
Figure 15B:
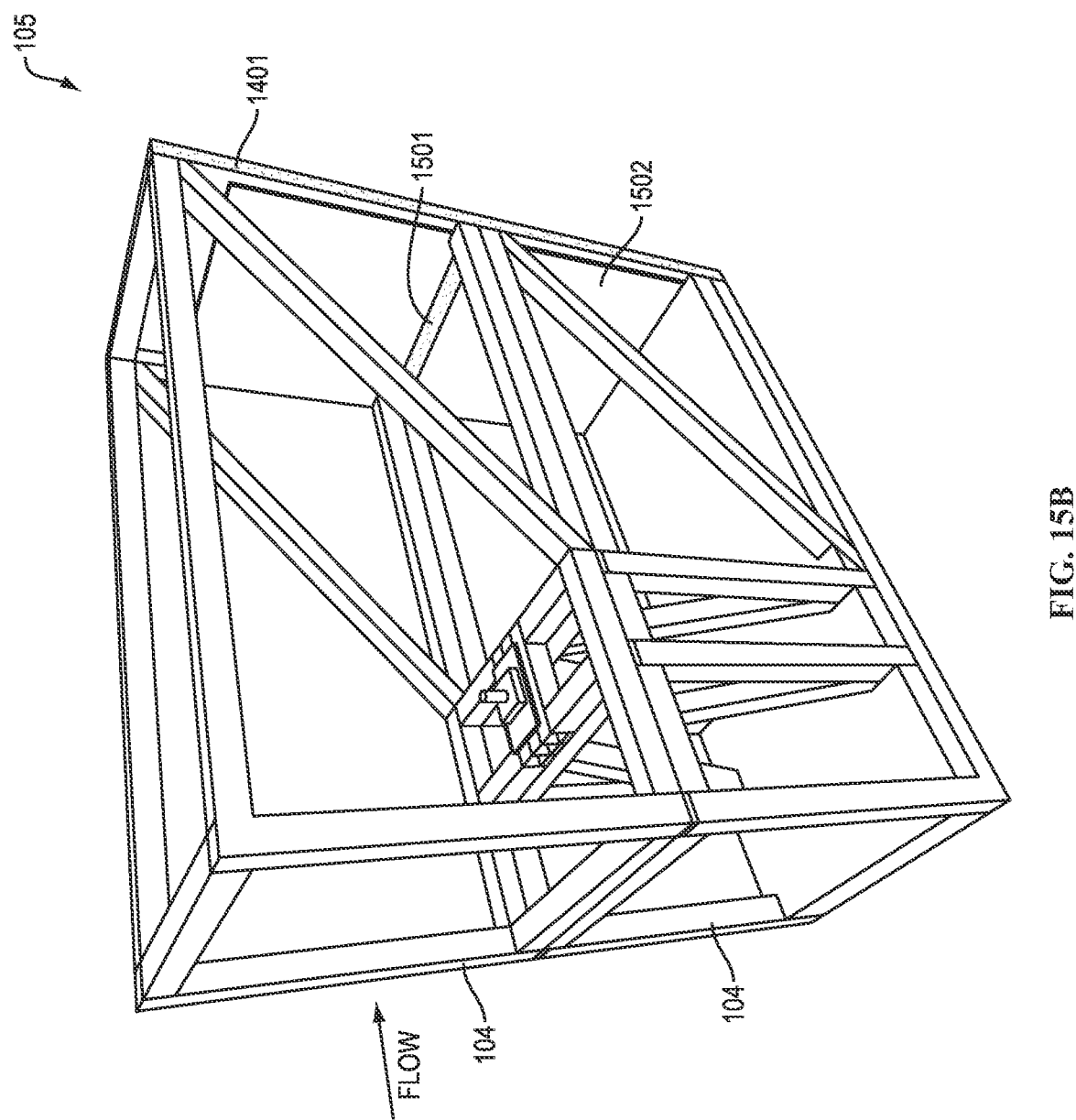
Figure 15D:
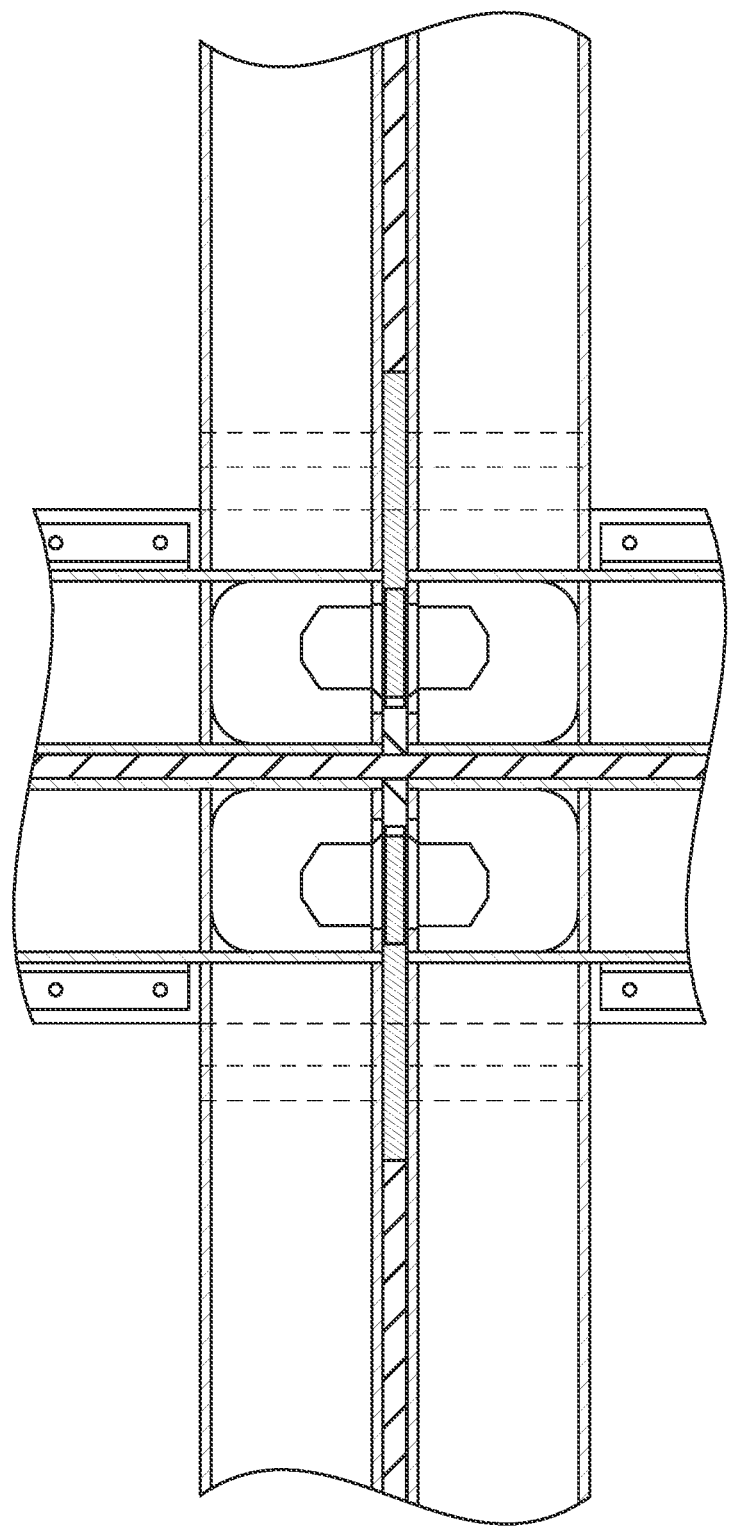
Figure 15H:
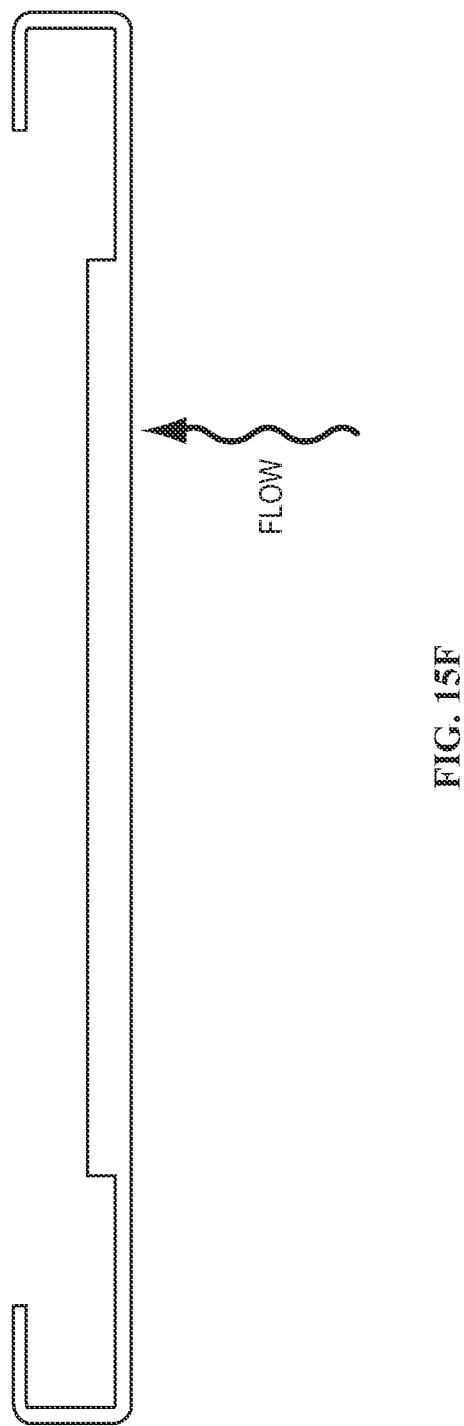
Figure 15G:
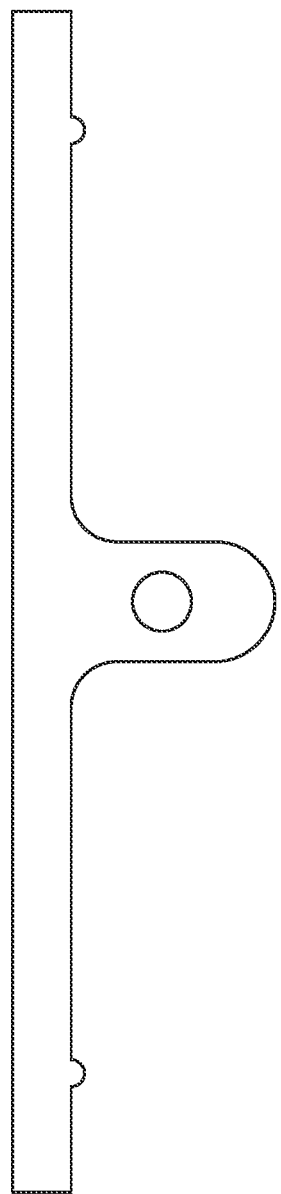
Figure 16:
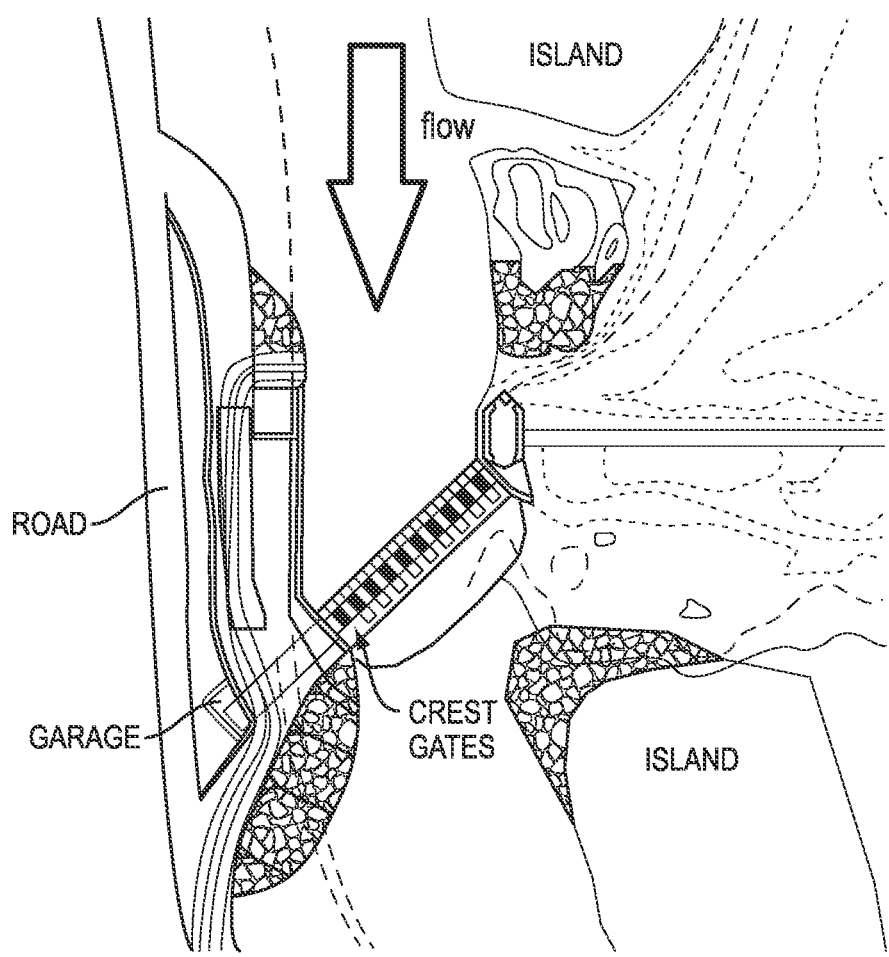
FIG. 16 is an illustration of an exemplary site plan of a facility showing an angled powerhouse.

Referring to FIG. 10, the conduit 502 can further be configured to include a rubberized outer tube 1001 and a smart fabric inner tube 1002, both of which can extend along the entire length of the conduit 502. The inner tube 1002 can be made of flexible textile materials, and, in an embodiment, can contain embedded circuit and sensor components to monitor the environment within the conduit 502. An air bladder 1003 can be disposed between the outer tube 1001 and inner tube 1002 to increase buoyancy of the conduit 502. The air bladder 1003 can also extend along the entire length of the conduit 502.

With an ability to monitor the environment within the conduit 502, the fish passage system 500 can be modified to improve fish survival rates and reduce costs. Sections of textile materials comprising the conduit 502 can be inexpensively replaced or easily modified. For example, if reduced water flow through the conduit 502 is found to be acceptable, smaller diameter sections can be used, or existing sections can be pleated to make them smaller. In an embodiment, sections of textile material forming the conduit 502 can be attached to each other with rigid couplings and external stiffening rings.

Independent Stack Modules & Seals for Modular Dams and Hydropower Facilities

Generally, as discussed above, the modules 104 can be used as building blocks to assemble prefabricated, modular systems for dams and hydropower facilities. The modules 104 can be stacked on top of each other to a desired height and attached together, vertically and/or horizontally, with bolted structural connections or other fasteners. Modules 104 can be utilized to build dam-module stacks, spillway-module stacks, and turbine-module stacks to assemble a modular hydropower installation.

In an embodiment, each stack 105 of modules 104 can be configured to be structurally independent by ensuring that there are no structural connections between adjacent stacks 105. In other words, each stack 105 can be individually secured to a foundation on a streambed using at least one post-tension anchor, but each stack 105 is not secured or affixed to adjacent stacks 105. This independent stack configuration allows for easy modification, replacement, and maintenance of stacks 105 individually.

Referring to FIGS. 5 and 11-15G, each module 104 in a stack 105 can be structurally and mechanically connected to a module 104 above or below it and to a stream bed at the same time by a post tension anchor 1202. In an exemplary installation process, the post tension anchor 1202 can be installed by first drilling a hole below grade, flushing all cuttings from the hole, preparing the subgrade for placement of the modules 104, then installing the subgrade portion of the anchor leaving a portion protruding above grade. The next step can be to grout the bond length. After the grout has cured for 4 days minimum and reached a target grout strength of 4,000 psi, the modules 104 can be placed in the stack 105 and using an appropriate coupler bar length can be added to the post tension anchor 1202, so that it can be passed through each module 104 in the stack 105 and post tensioned using an incremental lock off sequence against an anchor head assembly 1203 or other fastener. In an embodiment, shear connectors can also be utilized to prevent individual modules 104 from sliding off the module above or below it. Each stack 105 can be structurally attached and secured to a foundation 1204 on a riverbed using the post tension anchor 1202. A shear key can be coupled to the concrete slab supporting the stack 105 to prevent the stack 105 from sliding in an upstream or downstream direction. A grout bag can be inserted between the base module of the stack 105 and the concrete shear key to secure the stack 105 in place. The grout bag can be broken up and removed when the stack 105 is removed and replaced.

In an embodiment, each stack 105 can include vertical seals 1401 that can be installed vertically on the downstream side between adjacent stacks 105 to prevent leakage and provide a water-tight connection. Similarly, horizontal seals 1501 (see FIG. 15B) can be installed horizontally between the individual vertically-stacked modules 104 that form a particular stack 105. In an embodiment, the seals can be configured as compressible gaskets and sized to be positioned on vertical interfaces on the downstream side of the stacks 105 and on horizontal interfaces between modules 104 of a stack 105. In an embodiment, the horizontal seals 1501 can also be positioned between the stack 105 and its foundation and other interfaces. The seals 1401, 1501 can be made of neoprene or other suitable material. For example, in various embodiments, seals can be made of Adeka KBA-1510 FP, water-resistant soft neoprene O-ring cord stock, ASTM D-2000 1BC408/508/609/710/SAE J200.

Referring to FIGS. 11-13B and 16-18B, an exemplary small standardized prefabricated module hydropower (SSPMH) facility 1100, 1800 with foundation, generation and passage modules is illustrated. The SSPMH components can be included in a kit of prefabricated components that can be assembled on-site. In an embodiment, the building block modules 104 of the SSPMH facility can be manufactured in the form factor of 20-foot high-cube multimodal shipping containers—including standard attachment points such as slotted corner blocks—for low-cost transport by truck, rail or container ship. They can be configured to suit the specific characteristics of the site. In many cases, cofferdams or diversions can be eliminated or significantly reduced as part of the installation process.

Figure 17:
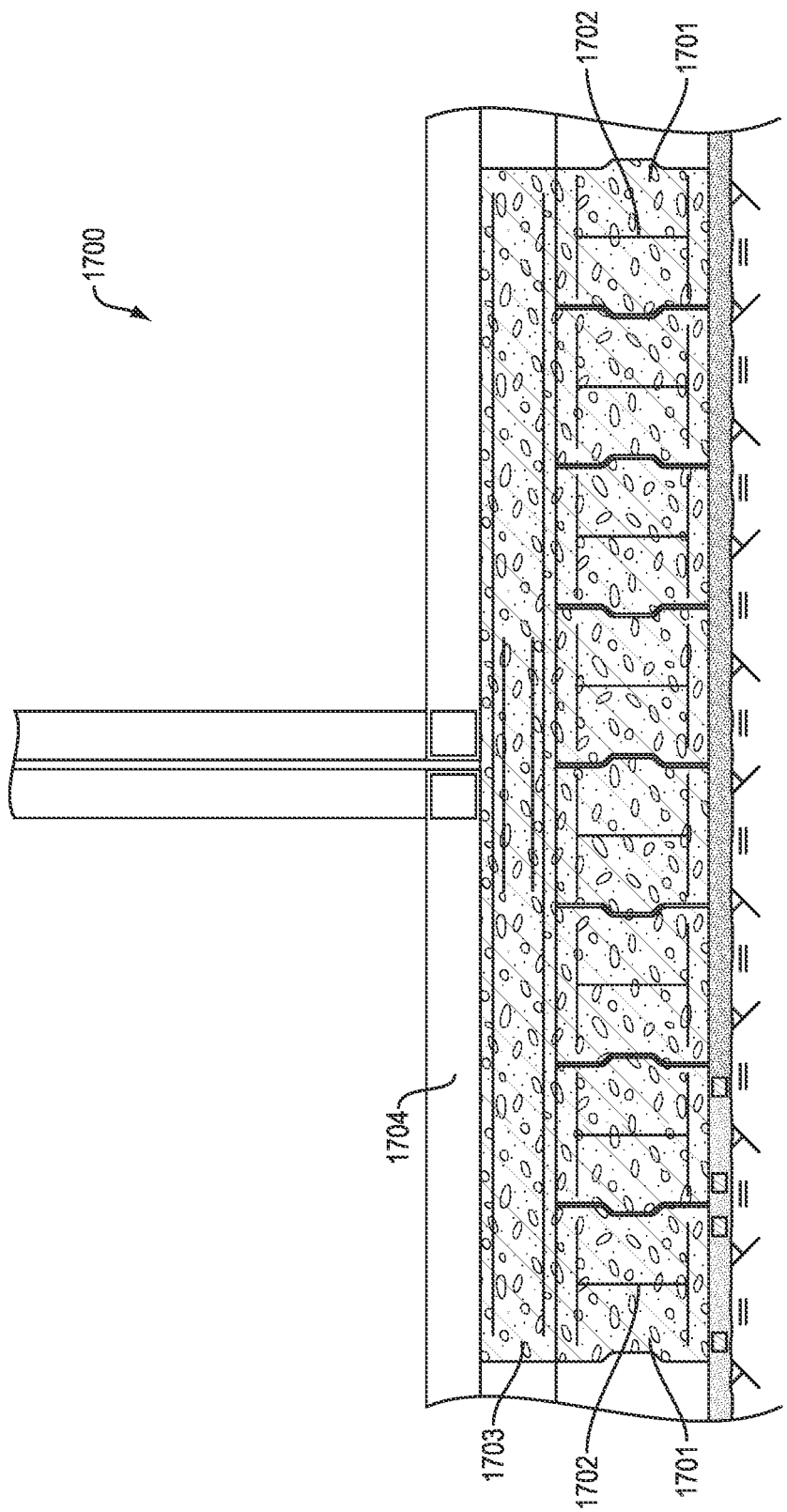
FIG. 17 is an illustration of a foundation of interlocking precast concrete planks in accordance with an embodiment of the present invention.

As shown in FIG. 17, a foundation structure 1700 can be utilized to support a SSPMH system 1100, 1800. The foundation structure 1700 can include multiple interlocking concrete segments/planks 1701 and each segment 1701 can be reinforced with an I-beam 1702. The concrete segments 1701 can be prefabricated and modular so that they can be assembled onsite. In an embodiment, each concrete segment 1701 can be precast at a size of approximately 2'×2' square and 36' long. The concrete segments 1701 can be laid side-by-side in the streambed and oriented so the interlocking joints and the long side of each segment/plank 1701 run parallel with the flow of water.

The foundation structure 1700 can further include a single or series of prefabricated, transverse reinforced concrete slabs 1703 that can be positioned on top of the concrete segments 1701. In an embodiment, the concrete slab 1703 can measure 1'×4'×8'. In various embodiments, multiple transverse concrete slabs 1703 can be stacked at different orientations to accommodate a desired design or specification. For example, two slabs 1703 can be stacked with each having, for instance, a 90 degree difference in orientation. In an embodiment, sockets can be precast into the concrete segments/planks 1701, and the slabs 1703 can include a sleeve and bolt that is used to connect and tension the planks 1701 and slabs 1703 together.

Prior to installing the foundation structure 1700, initial preparatory steps include removing loose, compressible and organic streambed materials to reach competent soil or bedrock, leveling the soil or bedrock, using chair jacks to level the base planks and then filling in with grout. Grout cures faster than concrete, has limited leaching compared to cast-in-place concrete, can cure in the wet, and has been approved by the Federal Energy Regulatory Commission to arrest seepage.

The foundation structure 1700 can also include a foundation base module 1704 that can be configured, in an embodiment, as a 8' wide×20' long×9.5' high structural steel base module. The foundation base module 1704 is positioned against the transverse concrete slab 1703, buy in some embodiments, a seal can be positioned between the base module 1704 and the slab 1703. Additional modules 104, such as a second or third module 104, can be stacked on top of the base module 1704 to achieve a desired height. Each stack can be oriented with the long dimension parallel to local flow of water. A water-retaining bulkhead 1502 can be affixed at the downstream face of the module stack 105. This configuration of the bulkhead 1502 affixed to the downstream face of the stack 105 allows the water to enter the modules 104 of the stack 105, and the weight of the entering water stabilizes the stack 105. Each stack 105 can be used to house systems such as turbine/generators, water release gates, etc., to create generation and passage modules (see FIGS. 12A, 12B, 13A, and 13B) for the SSPMH facility 1100, 1800.

Each stack 105 in the SSPMH system 1100, 1800 can be tied into the riverbed through the foundation with, for instance, via a 3-inch diameter high strength steel rod that can be used as a post-tensioning anchor. The above-ground portion of the post-tension anchor can be extended with a coupler to capture and secure the intermediate and top modules 104. The post-tension anchor can be post-tensioned to a preload of approximately 600 kips and locked off against the top module frame to greatly increase downward force at the foundation interface and achieve the minimum factors of safety requirements for sliding, overturning, and uplift stability. The addition of a large knife valve or slide gate to the water-retaining bulkhead 1502 at the bottom of the foundation base module 1704 allows it to serve for low water passage and/or sediment passage.

Another benefit of utilizing knife valves or slide gates is they allow assembly in the wet without requiring any separate cofferdam or water control bypass systems. In simplified terms, the in-the-wet construction sequence is to first install the upstream and downstream sheet piles on one half of the river, and install an additional sheet pile line near the middle of the river in an orientation perpendicular to the first two lines of sheet piles and parallel to the river flow to bound the first working area. Water can be allowed to flow uninterrupted through the second half of the river, while the modules 104 are assembled in the bounded half. Once the assembly is complete, the knife valves or slides gates are left open and the sheet piles are cut down to the riverbed. Water begins to flow through the open structure. The process is repeated on the second half of the river. Once the entire modular facility is constructed appropriate knife valves or slide gates can be closed and the facility can be taken to operational status.

In an embodiment, abutment walls 1802 (in FIG. 18A, 18B) can be implemented and can include a precast modular concrete retaining wall system, which provides vertical faces to interface with the ends of the module line on the inboard sides and to tie into the existing streambank topography on the outboard sides. An abutment system 1802 can include modular concrete units including a vertical concrete face panel attached to a single or double counterfort stem capable of creating upstream, downstream, and channel side abutments on both sides of a watercourse. The wall units can be stacked to create a tapered cross section with the longest stems at the bottom to develop a monolithic gravity block with a wide base for stability. Select backfill between the stems provides the mass for the wall and interlocks with the stems. Commercially available precast concrete wall systems of this type can be suitable for this application. At sites where overburden is present and it is impractical or uneconomic to excavate to bedrock, a modular retaining wall system is installed in conjunction with driven steel sheet piles extending both upstream and downstream of the foundation interface and into the abutment slopes for seepage control.

A generation module stack (see FIGS. 12A and 12B) can include an intake, turbine, generator, and outlet. It can include a base module that contains a preinstalled draft tube, a middle module with a seating plate for the turbine, and a top module with guide rails for a sliding cylinder gate to open the turbine intake. In general, a generation module stack can be placed adjacent to a foundation base module 1704 to ensure approach velocity at the intake stays below 2 fps. The turbine/generator units can be swapped out with the overall dam in "semi-hot" status—meaning that the other turbines continue to operate—and the cylinder gates are opened and shut via a gantry crane that travels along the top of the dam. The gantry crane also controls the lateral motion of a trash rake, which is attached to its upstream side. (See FIGS. 12A and 12B).

A water passage module stack (see FIGS. 13A and 13B) an include a base and intermediate module with a flat top module that can include a bottom-hinged pneumatically operated crest gate. It can also be modified to serve as a surface by-pass (downstream) fish passage.

The SSPMH system 1100, 1800 can be designed around the principle of exclusion—that is, no fish are passed through the turbine runners—so as to avoid entrainment issues altogether. The modular powerhouse can be rotated to give rise to headpond flow diagonal to the turbine intakes and an approach velocity at the trash rack of under 2 fps. In this way the downstream fish migrants continue straight downstream and avoid the turbines altogether. At the downstream end of the powerhouse another module can be used to safely pass the fish (see FIG. 16).

Overall stability of the system can be enhanced by utilizing the post-tensioned anchor to substitute for the mass of a traditional dam section. Typically, a dam relies on a substantial mass of concrete or earthen material to create a load normal to the foundation interface sufficient to engage enough friction to prevent the dam from sliding downstream due to the hydrostatic loading from the impoundment. The SSPMH system's modules 104 can be specifically designed to be relatively lightweight; therefore, another means can be used to resist sliding at the foundation interface, overturning and uplift. This stability is accomplished through the use of a tie-down anchor, which is bonded via grout to the foundation and locked off against the top module. The anchor assembly essentially squeezes the container-modules against the foundation.

The dam/foundation interface is important for dam stability; it provides surfaces with a high coefficient of friction to resist sliding, and appropriate stiffness to prevent differential settlement as between different parts of the foundation. The concrete segments/planks 1701 can be cast with a texture so as to maximize friction. Stiffness is obtained by the use of two layers of precast concrete planks connected with torqued slip-critical tension rods to obtain monolithic action.

The modules 104, 1704 themselves can be fabricated from 50 ksi hollow structural sections (HSS). The installation procedure can be summarized as follows. First, the foundation can be anchored on a coarsely leveled, competent subbase consisting of bedrock or coarse-grained soils. In either instance, for a low risk, safe installation the subbase area will need to be dewatered and prepared to receive the foundation's concrete segments/planks 1701. De-watering half the stream course at a time will allow preparation of the one half of the subbase in the dry and continuous stream flow around the dewatered half. The next step depends on riverbed conditions.

If the site is underlain by coarse-grained soils, the subbase is dewatered by driving interlocking steel sheet piles through these soils to refusal or bedrock. The piles extend from the upstream bank to the downstream bank in semi-circular fashion and extend high enough to prevent water from entering the dewatered area under normal flow conditions. Once the area has been prepared and the foundation base modules anchored in place, the piles are cut nearly flush with the bottom of the stream to return it to its full width. The portion of the piles that remain embedded in the coarse soils act as a barrier to minimize seepage beneath the foundation. This approach avoids the extra costs of a separate cofferdam. The opposite half of the stream course undergoes a similar process as above to prepare the remaining subbase. Low level outlet gates installed in the base container-modules of the first phase of construction are opened to pass the diverted stream flow through them.

If the site is underlain by bedrock, it is not possible to dewater the site using sheet piles. Instead, one half of the stream course may be dewatered using flexible intermediate bulk containers (FIBCS) filled with sand and installed in a semi-circular fashion. If necessary, steel plate can be sandwiched between the FIBCS to provide additional seepage control. The FIBCS are removed following placement of the first phase of modules and the process repeated on the opposite bank.

Either of the above construction processes ensures continuous flow of the stream course during construction and has minimal environmental impacts. In both instances, once both halves of the foundation base modules have been installed, the remaining assembly activities are performed with the stream course flowing normally through the low level outlets.

A water passage module stack (see FIGS. 13A and 13B) can be configured in multiple designs. For example, as a 5.2-foot gate for up to 275 cfs conveyance and as a 12-foot gate for up to 1,000 cfs conveyance.

Typically there will be some sediment buildup in the headpond, even in a pure run-of-the-river installation. Sediment can be passed at the base of each foundation base module 1704 through a water control element in the form of a knife valve or slide gate. An outlet orifice will be provided in the downstream bulkhead 1502 of each dam stack.

Periodic and programmatic opening of the gate under normal pool conditions will result in flow velocities to effectively flush sediment downstream to prevent erosion further downstream as well as for spawning. Periodic sluicing, flushing, or venting would maintain the bulk sediment transport regime averaged over the time between periodic sluicing/flushing/venting events.

With regard to constructing a prefabricated modular hydropower facility using shop-built components, the data that should be ascertained is the profile of the top 20-30 feet of geologic strata underneath a riverbed. Toward this end, the riverbed can be digitally profiled, and the foundation components can be pre-shaped using 3-D printing or computer controlled hot knife sculpting of polystyrene or other means to make mold inserts replicating the localized topographic conditions that the foundation blocks need to mate with. The precast elements can be sealed against the foundation, and in some cases, to shape the foundation. This technique may reduce the amount of site preparation and construction impact required to receive the modules and eliminate or reduce the need for chair jacks and the plank-leveling process steps.

While example embodiments have been particularly shown and described, it will be understood by those skilled in the art that various changes in form and details may be made therein without departing from the scope of the embodiments encompassed by the appended claims. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
    a plurality of modules vertically assembled to form at least one stack;
    a post-tension anchor securing the at least one stack individually to a foundation on a streambed; and
    wherein the at least one stack is not structurally secured or affixed to any adjacent stack, wherein the at least one stack includes:
        vertical seals that are installed vertically between adjacent stacks to prevent leakage and provide a water-tight connection, and
        horizontal seals installed horizontally between each of the vertically assembled modules that form the at least one stack;
    a shear connector coupled to at least one module in the plurality of modules to prevent any module from sliding off the module directly above or below;
    a shear key coupled to a concrete footing supporting the at least one stack to prevent the at least one stack from sliding in an upstream or downstream direction; and
    a grout bag positioned between each stack and each shear key to secure each respective stack in place, wherein the grout bag can be removed.

2. The system of claim 1 further comprising a compressible gasket positioned on vertical interfaces on a downstream side of the at least one stack to prevent leakage and provide a water-tight connection.

3. The system of claim 2 wherein the compressible gasket is made of neoprene.

4. The system of claim 1 further comprising a compressible gasket positioned between the at least one stack and the foundation.

5. The system of claim 1 wherein the vertical seals and the horizontal seals are configured as compressible gaskets.

6. The system of claim 1 wherein the horizontal seals are positioned between the least one stack and its foundation and other interfaces.

7. The system of claim 1 wherein the vertical seals and the horizontal seals are made of neoprene.

8. The system of claim 1 wherein the vertically assembled plurality of modules are configured as building blocks to assemble prefabricated, modular systems for dams and hydropower facilities.

9. The system of claim 1 wherein the vertically assembled plurality of modules are configured to be stacked on top of each other to a desired height and attached together, vertically and/or horizontally, with bolted structural connections.

* * * * *